United States Patent
Al-Samadi

(10) Patent No.: US 7,981,295 B2
(45) Date of Patent: Jul. 19, 2011

(54) ENHANCED HIGH WATER RECOVERY MEMBRANE PROCESS

(76) Inventor: Riad A. Al-Samadi, Burlington (CA)

(*) Notice: Subject to any disclaimer, the term of this patent is extended or adjusted under 35 U.S.C. 154(b) by 0 days.

(21) Appl. No.: 12/541,482

(22) Filed: Aug. 14, 2009

(65) Prior Publication Data

US 2011/0094965 A1  Apr. 28, 2011

Related U.S. Application Data

(60) Provisional application No. 61/136,137, filed on Aug. 14, 2008.

(51) Int. Cl.
*B01D 61/02* (2006.01)
*B01D 61/04* (2006.01)
*B01D 61/08* (2006.01)
*B01D 21/01* (2006.01)

(52) U.S. Cl. ........ 210/652; 210/638; 210/641; 210/650; 210/651; 210/660; 210/702; 210/703; 210/705; 210/712; 210/713; 210/723; 210/724; 210/725; 210/729; 210/738; 210/749; 210/767; 210/768; 210/805; 210/806

(58) Field of Classification Search .................. 210/638, 210/641, 650, 651, 660, 663, 669, 702, 703, 210/705, 712, 713, 723, 724, 725, 729, 738, 210/749, 767, 768, 805, 806

See application file for complete search history.

(56) References Cited

U.S. PATENT DOCUMENTS

| | | | |
|---|---|---|---|
| 3,799,806 A | | 3/1974 | Madsen |
| 4,000,065 A | | 12/1976 | Ladha et al. |
| 4,083,779 A | | 4/1978 | Combe et al. |
| 4,392,959 A | * | 7/1983 | Coillet ............ 210/638 |
| 4,775,477 A | | 10/1988 | Stahl et al. |
| 5,182,023 A | | 1/1993 | O'Connor et al. |
| 5,501,798 A | * | 3/1996 | Al-Samadi et al. ........ 210/652 |
| 5,925,255 A | | 7/1999 | Mukhopadhyay |
| 6,113,797 A | * | 9/2000 | Al-Samadi ........... 210/652 |
| 6,416,668 B1 | * | 7/2002 | Al-Samadi ........... 210/636 |
| 6,461,514 B1 | * | 10/2002 | Al-Samadi ........... 210/652 |
| 6,537,456 B2 | | 3/2003 | Mukhopadhyay |

* cited by examiner

*Primary Examiner* — John Kim
(74) *Attorney, Agent, or Firm* — Hodgson Russ LLP

(57) ABSTRACT

Disclosed is an economical process for the purification of water containing soluble and sparingly soluble inorganic compounds using single-stage or two-stage membrane processes that integrate membrane water purification with chemical precipitation softening and residual hardness and silica removal from the membrane concentrates using ion exchange resins and silica sequestering media, respectively. The purified water recovery is not adversely affected by design and/or operational deficiencies in the chemical precipitation softening system that may result in higher residual hardness and silica in the supernatant from the clarifier.

3 Claims, 15 Drawing Sheets

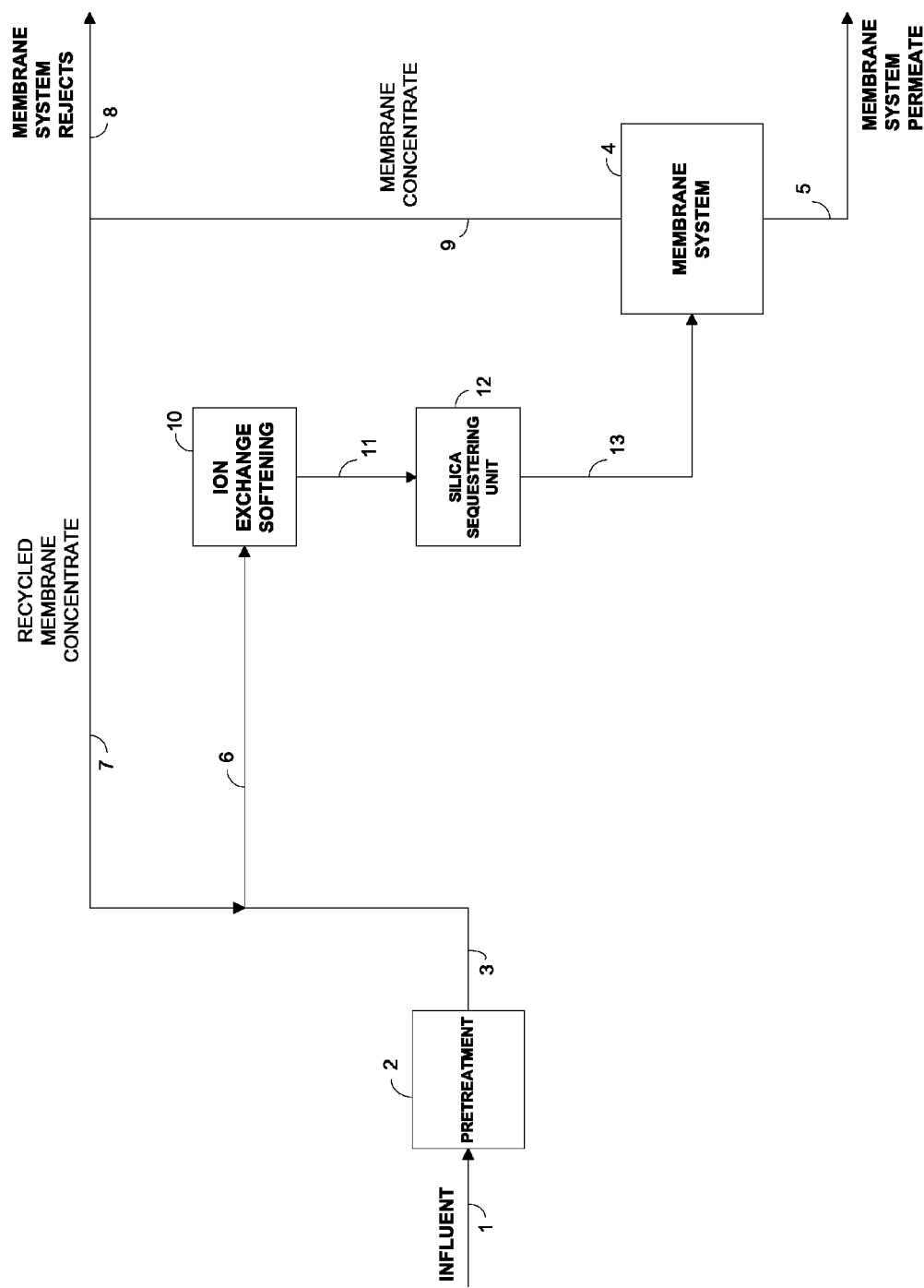

ENHANCED HIGH WATER RECOVERY MEMBRANE PROCESS

This application claims benefit of U.S. Provisional Application No. 61/136,137 filed Aug. 14, 2008.

BACKGROUND OF THE INVENTION

This invention relates to the economical purification of water containing soluble and sparingly or partially soluble inorganic compounds using single-stage or two-stage membrane processes that integrate membrane water purification with chemical precipitation softening and complete hardness and silica removal using ion exchange resins and silica sequestering beds, respectively.

Hardness compounds such as barium, calcium, magnesium, iron, carbonate, bicarbonate, fluoride, sulfate and silica are commonly found in surface water sources such as lakes and rivers, groundwater sources such as water wells and aquifers and in aqueous industrial effluents including cooling tower blow-down, boiler blow-down and landfill leachates. These sparingly soluble contaminants limit the percentage recovery of purified water permeate from reverse osmosis (RO) and nano-filtration (NF) membrane systems, as they tend to form scale compounds upon concentration, which deposit, often irreversibly, on the surface of the membranes and reduce their useful service life.

In order to prevent premature fouling and deposition of scale compounds on the RO or NF membrane surfaces, the raw water is pre-treated by adding acid to increase the solubility of "temporary" hardness compounds, by using ion exchange softening to remove hardness ions, or by chemical precipitation of the hardness compounds and silica using "cold lime" or "hot lime" softening processes. When chemical precipitation softening pretreatment is required, this step is followed by clarification, preferably using solids contact clarifier and filtration using gravity or pressure sand filters, multimedia filters or "fine media" pressure filters. Alternatively, the clarified supernatant can be filtered by ultrafiltration or microfiltration membranes where any entrained suspended solids and fine colloids from the clarifier are completely removed, producing a membrane filtrate with very low 15-minute silt density index ($SDI_{15}$) of <3 which is suitable for purification and desalting using reverse osmosis (RO) membranes or nanofiltration (NF) membranes.

In order to increase the recovery percentage of RO or NF membrane permeate, the pre-concentrated sparingly soluble compounds can be further precipitated by the addition of lime or sodium hydroxide in an inter-stage RO concentrate softening step, followed by additional clarification of the precipitated hardness compounds and silica, filtration of the clarifier supernatant and purification through a second RO or NF membrane stage to achieve further permeate recovery. However, these processes are limited to achieving overall (i.e. total) 2-stage membrane system recoveries in the range 80%-85%.

A survey of prior art shows the following patents:

U.S. Pat. No. 4,000,065 discloses the use of a combination of reverse osmosis (RO) and ultrafiltration (UF) to separate organic material from the aqueous stream. The contaminated aqueous stream is circulated from the high pressure compartment of an RO unit to the high pressure compartment of a UF unit, then to the low pressure compartment of the UF unit and then back to the high pressure compartment of the RO unit.

Japanese Patent 57-197085 discloses a filtration apparatus that comprises connecting UF apparatus and RO apparatus in series so as not to deposit scale on the RO membrane.

U.S. Pat. No. 3,799,806 discloses purification of sugar juices by repeated ultrafiltration and reverse osmosis purification steps.

U.S. Pat. No. 4,083,779 discloses a process for treatment of anthocyante extract by ultrafiltration and reverse osmosis treatments.

U.S. Pat. No. 4,775,477 discloses a process for extraction of cranberry presscake wherein the presscake is ground and subjected to microfiltration to remove colloidal high molecular weight compounds followed by reverse osmosis to recover a red-colored solution.

U.S. Pat. No. 5,182,023 discloses a process for removing arsenic from water wherein the water is first filtered to remove solids then passed through an ultrafilter, followed by a chemical treatment to adjust pH to a range from about 6 to 8. Thereafter, scale-inhibitors and anti-fouling materials are added before subjecting the water to reverse osmosis to provide a stream having less than about 50 ppb of arsenic.

Japanese Patent 53025-280 discloses the separation of inorganic and organic compounds from a liquid by first using a reverse osmosis membrane and then using a second reverse osmosis membrane having a more permeable membrane such as a microporous or ultrafiltration membrane. Part of the contaminated liquid obtained from the first membrane is processed through the second membrane.

U.S. Pat. No. 5,501,798 discloses a high recovery water purification process involving the use of reverse osmosis followed by chemical precipitation of hardness compounds from the RO concentrate followed by microfiltration to separate precipitated solids and recycling of the "suspended solids' free concentrate" back to the RO.

U.S. Pat. No. 5,925,255 and U.S. Pat. No. 6,537,456 disclose a process in which the calcium and magnesium hardness in the raw water is completely removed using hydrogen form or sodium-form weak acid cation ion exchange (IX) softening resin, followed by pH elevation by adding sodium hydroxide to increase the silica solubility and prevent its precipitation as membrane permeate recovery is increased. The pH elevation also mitigates biological fouling. This process achieves a permeate recovery of 90% or more, depending on the raw water TDS and membrane system operating pH.

U.S. Pat. No. 6,113,797 discloses a 2-stage high recovery membrane process, where the pre-concentrated hardness and silica in the RO or NF membrane concentrates are removed by chemical precipitation or by ion exchange if silica is not present in limiting concentrations, since silica is not removed by IX resins. This prior art process discloses softening and recycling of the high TDS $2^{nd}$ stage membrane concentrate and blending it with the first stage RO membrane concentrate to enable further purification and water recovery from the second stage, thereby achieving overall permeate recoveries >95% in an economical manner, without resort to using costly multiple, discreet inter-stage softening and membrane stages.

U.S. Pat. No. 6,461,514 discloses a single stage high recovery membrane process, where the pre-concentrated hardness in the RO or NF membrane concentrates is removed by ion exchange. The softened high TDS membrane concentrate is recycled and blended with the raw Influent Water to enable further purification and water recovery, thereby achieving overall permeate recoveries >95% in an economical manner.

In all Prior Art silica-limiting applications where the hardness and silica compounds are precipitated simultaneously by elevating the pH with calcium hydroxide (lime), sodium hydroxide or other alkali solutions, it is necessary to provide effective and intimate contacting between the high pH water and the precipitated suspended solids. Efficient solids contacting will improve the extent of reaction of hardness precursors with the chemical reagents, resulting in higher hardness and silica precipitation efficiencies. The lower the residual sparingly soluble hardness and silica compounds in the clarifier supernatant, the higher the extent of achievable permeate recovery by the membrane system since the recovery is limited by solubility of these compounds, which will further concentrate over the membrane surface. The precipitated solids are removed by using a coagulant and/or a polymeric flocculant to enhance settling of the solids, enabling their removal from the bottom of the clarifier, while reducing the concentration of entrained fine particles that may be carried over into the filtration train downstream.

There have been many clarifier process enhancements aimed at maximizing the efficiency of precipitation and subsequent settling and removal of hardness compounds and silica. Recycling of slurry containing precipitated solids from the bottom of the clarifier to the mixing/reaction zone has been practiced for decades. Some companies have introduced a method of seeding of hardness particles to provide nucleation sites that will enhance the effectiveness of the precipitation process. Others introduce inert sand-like particles of relatively small particle size to provide a large contacting surface over which the precipitation reactions can take place, achieving higher hardness and silica precipitation rates, thus enabling use of smaller retention times in the clarifier and reducing its capital cost. However, this process is rather complex, involving separation and recovery of the inert solids in an external cyclonic separator and recycling back to the clarifier, with the loss of some of the inert solids, thus adding to the waste sludge volume generated and increasing the operating and maintenance costs.

As it can be seen, these prior art processes have limitations since they can not ensure very low residual hardness and silica concentrations in the clarifier supernatant on a consistent basis. There are many variables that affect the clarifier performance, including the influent water temperature, the pH, the dosage of alkali chemicals, coagulants and flocculants which are dependent on the flowrates and the concentrations of sparingly soluble compounds in the influent water. Furthermore, the equipment enhancements described above, while offering increased effectiveness and improved precipitation performance, are costly and involve substantial additional operating and maintenance costs. Significant concentrations of hardness cations (i.e. calcium and magnesium) still remain in the clarifier supernatant.

Since it is critical to maximize the overall membrane process permeate (i.e. purified water) recovery, in view of increasing worldwide water costs, water shortages and the escalating need for municipal and industrial water reclamation, what is needed therefore is a reliable process that is less susceptible to the above-described limitations. What is needed is a process and processes that will ensure very high efficiencies of removal of the hardness and silica compounds and achieve high overall recoveries >95%, irrespective of the influent water quality, the influent water hardness and silica concentrations, flowrate or operational problems and inefficiencies associated with the "solids" precipitation equipment.

SUMMARY OF THE INVENTION

It is an object of the invention to provide an improved process for the treatment of small and large flowrates of Influent Water from natural sources or wastewater containing "sparingly soluble" inorganic scale-forming compounds.

It is another object of the invention to provide an improved process using a single stage or 2-stage membrane process to purify the Influent Water and recover 67%-99.9% of the water as purified water without incurring the risk of precipitation of scale-forming compounds on the surface of the membranes which reduces the life of the membranes.

It is still another object of the invention to prevent precipitation of scale-forming compounds on the membrane surface by chemically precipitating said compounds from the membrane concentrate in an external recycle loop by adding a suitable alkali compound, followed by coagulating, flocculating and removing said precipitated compounds thereby producing a chemically softened membrane concentrate for further water recovery and recycling.

Yet it is another object of the invention to enhance the membrane concentrate softening process by removing residual hardness and silica from said chemically softened membrane concentrate, using an ion exchange softening resin, a silica sequestering media or both, to ensure consistent and almost complete removal of said scale-forming compounds from the membrane concentrate, thus preventing deposition on the membrane surface, preventing permeate flux loss and preventing premature cleaning and/or membrane replacement.

These and other objects of this invention will become clear from the specification, claims and drawings appended hereto.

In accordance with these objects, there is provided an improved membrane process for the treatment of water from natural sources or wastewater containing "sparingly soluble" inorganic scale-forming compounds wherein very high permeate recoveries in the range 67%-99.9% are achieved in a reliable and consistent manner. The Influent Water, containing the inorganic scale-forming compounds as well as completely soluble inorganic and low concentrations of organic compounds is first pre-treated in order to separate virtually all of the suspended matter including oil and grease by using an oil separation device, followed by chemical coagulation, flocculation, clarification and/or gravity settling, and multi-media filtration. Alternatively, the Influent Water is pre-filtered using micro-media (i.e. fine particle) filtration, micro-filtration membranes or ultra-filtration membranes to effectively separate all of the suspended solids and colloidal matter. If iron is also present in the Influent Water, the water must be aerated using appropriate in-tank air spargers before coagulation, flocculation and/or filtration.

The pre-treated Influent Water in the present invention is purified by a 2-stage or single stage membrane system operating at suitable pressures depending on the concentration of soluble compounds in the Influent Water and the desired overall permeate recovery. In order to prevent formation of scale compounds on the membranes, the membrane concentrate (also known as retentate) is softened by adding a suitable alkali compound to raise the pH and precipitate the sparingly-soluble hardness compounds, followed by coagulating, flocculating and removing said precipitated compounds in a clarifier or settling tank.

The chemically softened membrane concentrate is further softened by using ion exchange (IX) water softening resins, silica sequestering media or a combination of both to ensure almost complete removal of residual cationic scale precursors (i.e. calcium, magnesium, barium, iron, aluminum, amongst other sparingly soluble multi-valent ions) which will otherwise cause scale formation on the membranes and reduce the process reliability and its ability to consistently achieve the desired permeate recoveries in the range 67% to 99.9%. The completely softened membrane concentrate will contain a high concentration of soluble ions, also known as the total dissolved solids (TDS). The softened membrane concentrate is recycled and blended with the Influent Water in the case of the single-stage process, or blended with the first stage membrane concentrate in the case of the 2-stage process to undergo further purification. A small volume of concentrate is removed from the system upstream from the IX water softening resin, combined with a small slurry reject stream from the bottom of the clarifier and disposed of as an overall process reject stream, in order to control the membrane's osmotic pressure, prevent precipitation and control the overall membrane system's permeate recovery in the range 67%-99.9%.

BRIEF DESCRIPTION OF THE DRAWINGS

FIG. 15 is a schematic representation of yet another embodiment of the enhanced high recovery single stage membrane process depicted in FIG. 14 (IX-SSU-RO), which treats low flow Influent Water containing high TDS, moderate hardness and low to moderate silica and recovers 67% to 99.9% of purified water, while eliminating the risk of deposition of hardness, silica and other scale compounds on the surface of membrane unit.

DETAILED DESCRIPTION OF THE PREFERRED EMBODIMENTS

Figure 1:
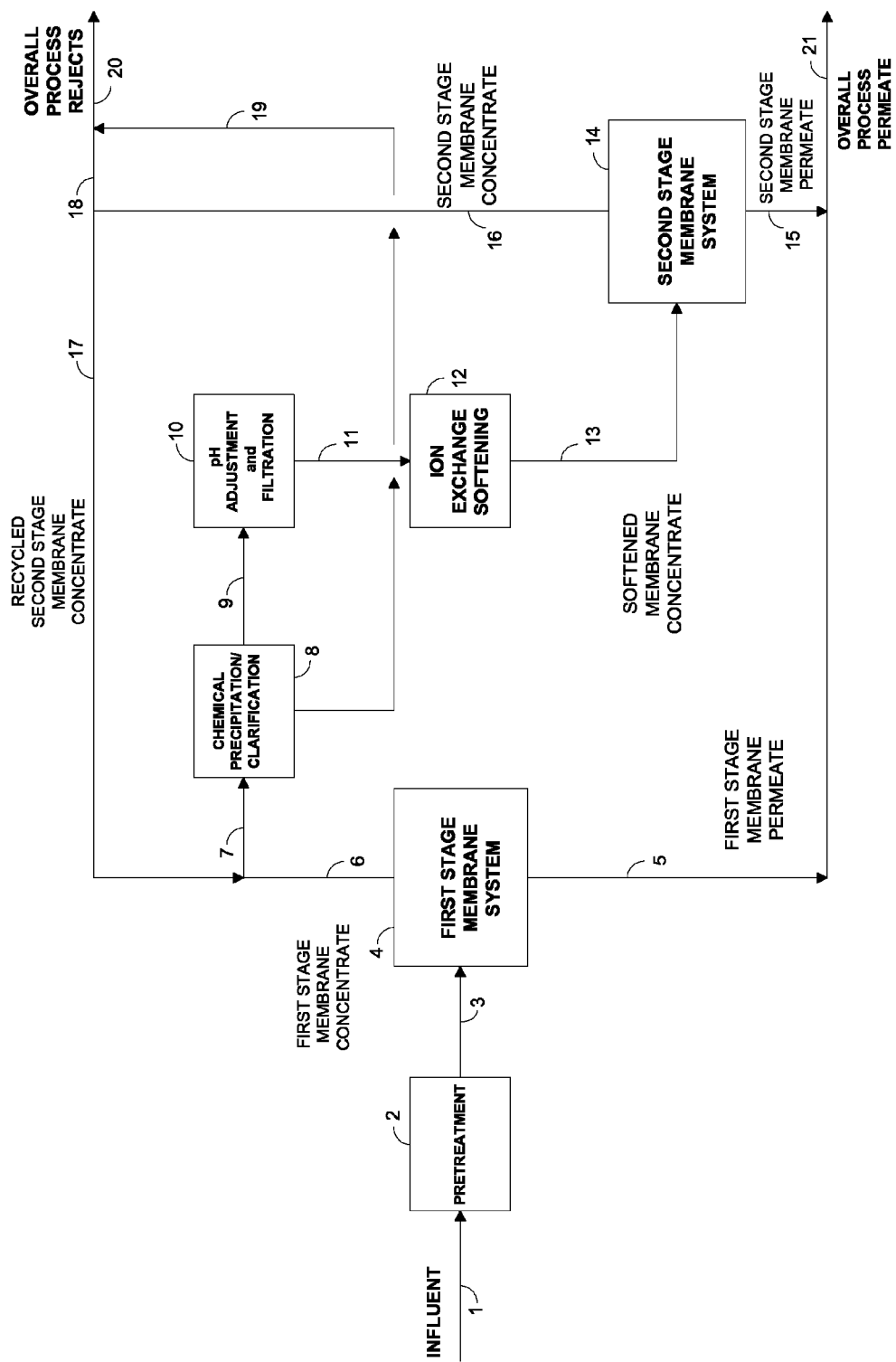
FIG. 1 is a schematic representation of an enhanced high recovery 2-stage membrane process (RO1-CP-IX-RO2) which treats high flowrates of Influent Water containing low Total Dissolved Solids (TDS), moderate to high hardness and low to moderate silica concentrations and recovers 67% to 99.9% of purified water, while eliminating the risk of deposition of hardness, silica and other scale compounds on the membrane surface.

In the drawings that illustrate embodiments of the invention, FIG. 1 (FIG. 1) is a schematic representation of an enhanced high recovery 2-stage membrane process (RO1-CP-IX-RO2) which treats high flowrates of Influent Water containing low Total Dissolved Solids (TDS), moderate to high hardness and low to moderate silica concentrations and recovers 67% to 99.9% of purified water, while eliminating the risk of deposition of hardness, silica and other scale compounds on the membrane surface. The Influent Water 1 is pretreated in 2 to remove suspended solids and chemically conditioned to mitigate scale formation on the first stage membrane system 4. The concentrate from the first stage membranes is chemically softened in 8 by adding a suitable alkali solution to raise the pH and precipitate most of the hardness and silica compounds. After clarification, filtration and pH adjustment of the chemically softened supernatant in 10, residual hardness in said supernatant is removed by passage through an ion exchange unit 12 before final purification through the second stage membrane unit 14. In contrast with prior art, the IX softening step 12 in the present invention ensures virtually complete removal of hardness, thus enabling efficient operation of the second stage membranes 14 and achieving very high overall permeate recoveries without precipitation of hardness compounds on said second stage membranes. Furthermore, by placing the chemical precipitation softening step and IX hardness polishing step consecutively upstream of the second stage RO membrane system, said second stage membrane system will operate at its maximum achievable recovery, limited only by the osmotic pressure, while preventing precipitation of hardness compounds and other fouling material including iron, manganese, barium and aluminum on the membrane surface. The second stage membrane concentrate 17 is recycled and blended with first stage membrane concentrate followed by further softening and purified water recovery in the second stage, as detailed above. A small stream of high TDS second stage membrane concentrate 18 is combined with clarifier slurry rejects 19 and discharged as a small process reject stream 20. The second stage membrane permeate 15 is combined with the first stage membrane permeate 5 and removed as final recovered product 21.

Figure 2:
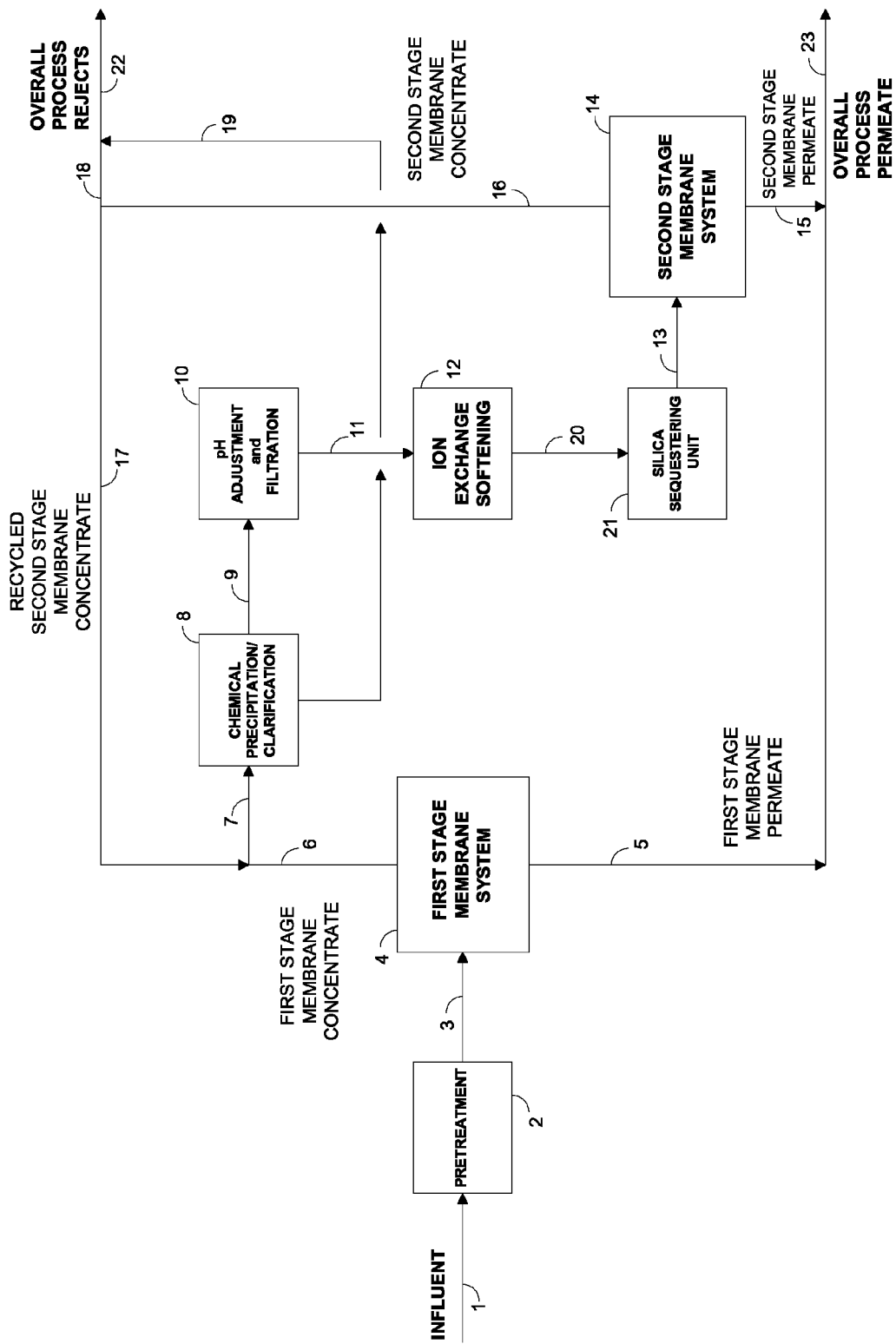
FIG. 2 is a schematic representation of another embodiment of the enhanced high recovery 2-stage membrane process of FIG. 1 (RO1-CP-IX-SSU-RO2) which treats high flow, low TDS, moderate to high hardness and high silica Influent Water and recovers 67% to 99.9% of purified water, while eliminating the risk of deposition of hardness, silica and other scale compounds on the membrane surface.

FIG. 2 is a schematic representation of another embodiment of the enhanced high recovery 2-stage membrane process of FIG. 1 (RO1-CP-IX-SSU-RO2) which treats high flow, low TDS, moderate to high hardness and high silica Influent Water 1 and recovers 67% to 99.9% of purified water, while eliminating the risk of deposition of hardness, silica and other scale compounds on the membrane surface. This embodiment of the invention is similar to the embodiment illustrated in FIG. 1 with the exception that in addition to the IX hardness polishing step 12, the chemically softened, clarified, filtered, chemically conditioned and IX-polished combined membrane concentrate 20 is treated further by using a silica sequestering unit 21. This step ensures complete removal of residual silica in view of the high silica concentration in the Influent Water 1, thus enabling efficient operation of the second stage membranes 14 and achieving very high overall permeate recoveries without precipitation of hardness compounds and silica on said second stage membranes. As described in the embodiment of FIG. 1, the second stage membrane concentrate 17 is recycled and blended with first stage membrane concentrate 6 followed by chemical softening in 8 as detailed earlier. A small stream of high TDS second stage membrane concentrate 18 is combined with clarifier slurry rejects 19 and discharged as a small process reject stream 22. The second stage membrane permeate 15 is combined with the first stage membrane permeate 5 and removed as final recovered purified water 23.

Figure 3:
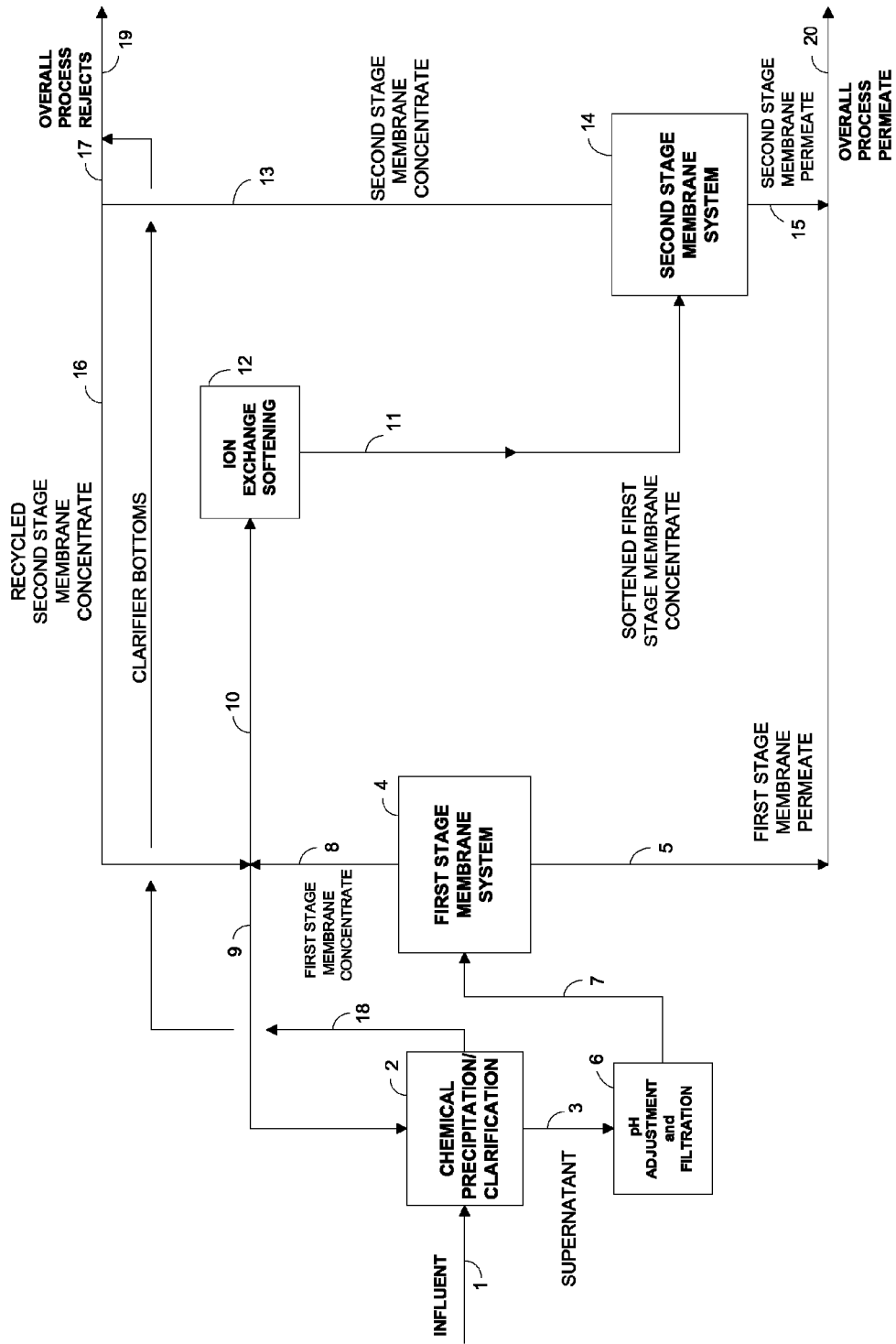
FIG. 3 is a schematic representation of yet another embodiment of the enhanced high recovery 2-stage membrane process of FIG. 1 (CP-RO1-IX-RO2) which treats high flowrates of Influent Water containing low TDS, high to very high hardness and moderate silica concentrations and recovers 67% to 99.9% of purified water, while eliminating the risk of deposition of hardness, silica and other scale compounds on the membrane surface.

FIG. 3 is a schematic representation of yet another embodiment of the enhanced high recovery 2-stage membrane process of FIG. 1 (CP-RO1-IX-RO2) which treats high flowrates of Influent Water containing low TDS, high to very high hardness and moderate silica concentrations and recovers 67% to 99.9% of purified water, while eliminating the risk of deposition of hardness, silica and other scale compounds on the membrane surface. This embodiment is similar to the embodiment of FIG. 1 with the exception that the CP softening step 2 and pH adjustment and filtration step 6 are placed upstream of (i.e. before) the first stage membrane system 4. In this location, the CP step will remove most of the hardness and silica from the Influent 1, e.g. cooling tower blowdown effluents, before the first stage membranes, thus enabling said first stage membranes to achieve a reasonably high recovery of permeate (i.e. treat up to 80% of the Influent) at low pressure and incur low energy costs. The high permeate recovery from said first stage membranes compared to prior art is achieved by recycling a large fraction of said first stage membrane concentrate 9 to the CP unit 2 to enable continuous hardness and silica removal as said hardness, silica and other fouling compounds are concentrated over the surface of said first stage membranes. Any residual hardness in said first stage membrane concentrate 10 is further removed by the ion exchange softening unit 12, before introducing the completely softened first stage membrane concentrate 11 into the second stage membrane unit 14 where further purified water recovery is achieved via second stage membrane permeate 15. As described in the embodiment of FIG. 1, the second stage membrane concentrate 16 is recycled, combined with first stage membrane concentrate 8 and introduced as stream 10 into the IX Softening unit 12 in order to continuously remove hardness ions and fouling material that are built up over said second stage membrane unit 14, thus achieving very high overall recoveries in the range 67% to 99.9%, without precipitation of scale compounds and fouling material over said second stage membranes. A small stream of high TDS second stage membrane concentrate 17 is combined with clarifier slurry rejects (i.e. bottoms) 18 and discharged as a small process reject stream 19. The second stage membrane permeate 15 is combined with the first stage membrane permeate 5 and removed as final recovered (purified water) product 20.

Figure 4:
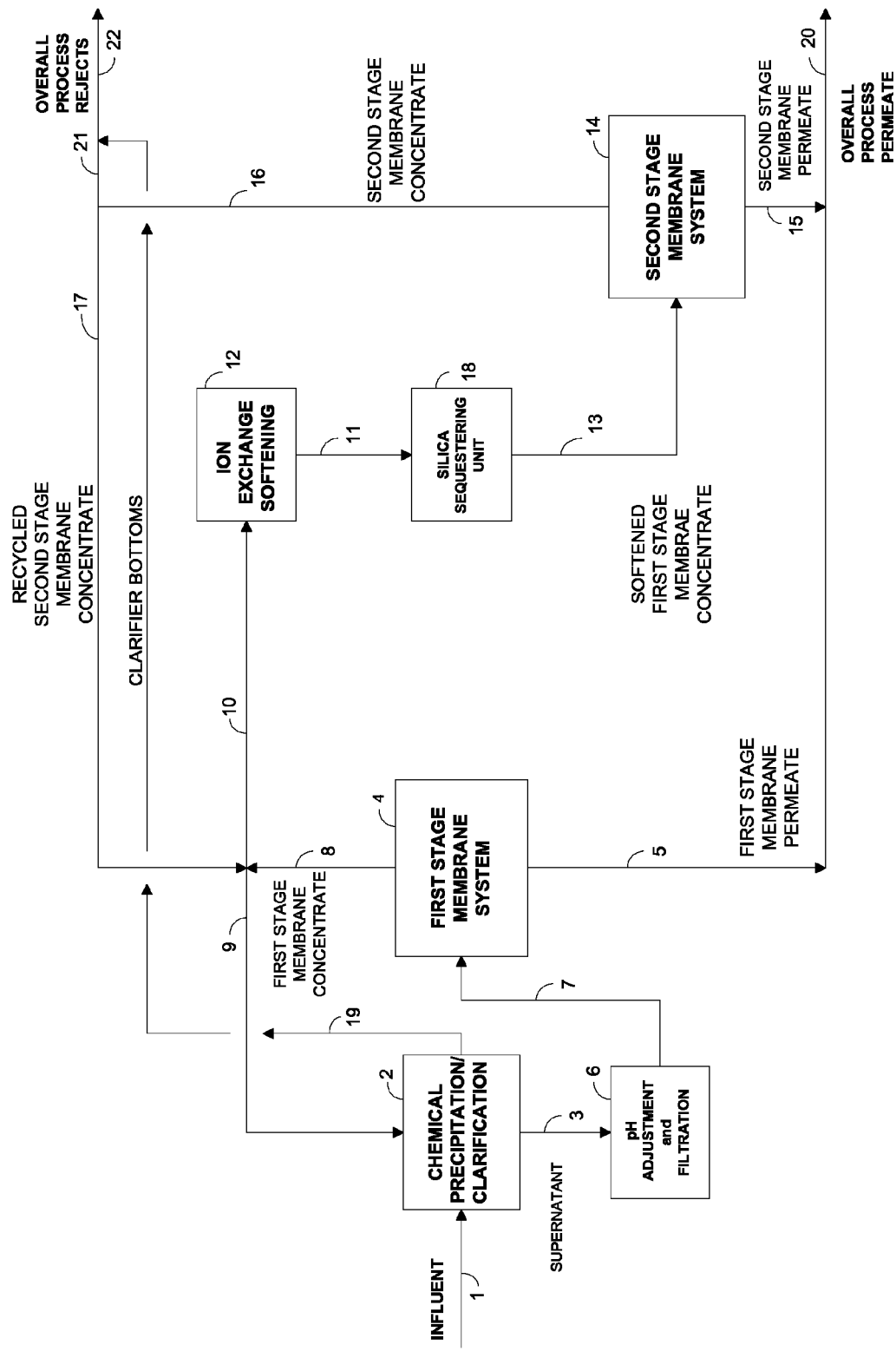
FIG. 4 is a schematic representation of another embodiment of the enhanced high recovery 2-stage membrane process of FIG. 3 (CP-RO1-IX-SSU-RO2) which treats high flowrates of Influent Water containing low TDS, high to very high hardness and high silica concentrations and recovers 67% to 99.9% of purified water, while eliminating the risk of deposition of hardness, silica and other scale compounds and fouling material on the membrane surface.

FIG. 4 is a schematic representation of another embodiment of the enhanced high recovery 2-stage membrane process of FIG. 3 (CP-RO1-IX-SSU-RO2) which treats high flowrates of Influent Water containing low TDS, high to very high hardness and high silica concentrations and recovers 67% to 99.9% of purified water, while eliminating the risk of deposition of hardness, silica and other scale compounds and fouling material on the membrane surface. This embodiment is very similar to the embodiment of FIG. 3 with the exception that a silica sequestering unit 18 is added downstream from the IX softening unit 12 in order to ensure efficient removal of silica from the IX-softened first stage membrane concentrate 11, in view of the high silica concentration in the Influent 1. This will enable further purified water recovery by the second stage membrane unit 14 in a safe manner, without the risk of deposition of silica on said second stage membranes.

Figure 5:
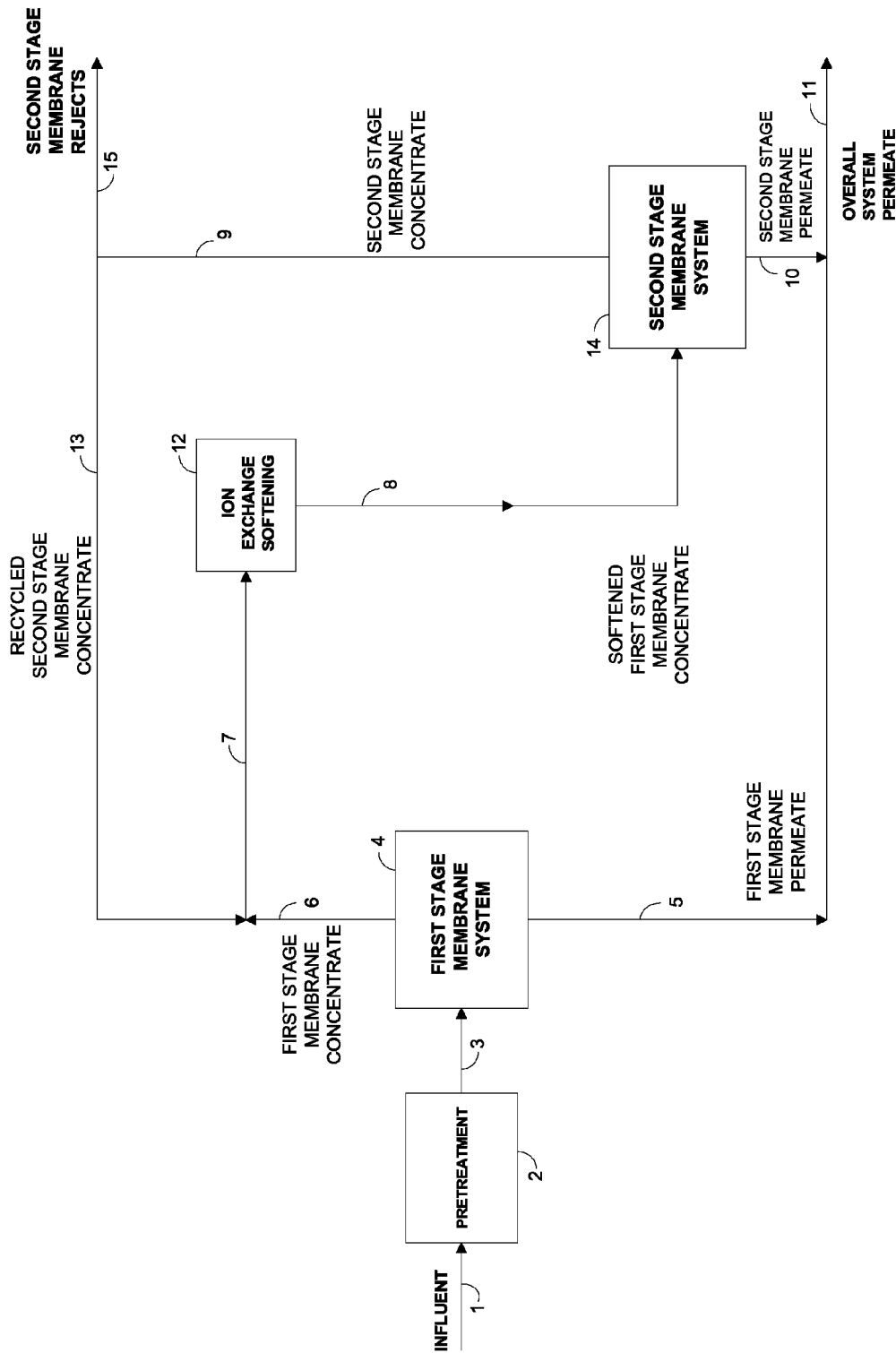
FIG. 5 is a schematic representation of yet another embodiment of the enhanced high recovery 2-stage membrane process of FIG. 1 (RO1-IX-RO2) which treats high flowrates of Influent Water containing low TDS, moderate to high hardness and very low silica concentrations and recovers 67% to 99.9% of purified water, while eliminating the risk of deposition of hardness, silica and other scale compounds on the membrane surface.

FIG. 5 is a schematic representation of yet another embodiment of the enhanced high recovery 2-stage membrane process of FIG. 1 (RO1-IX-RO2) which treats high flowrates of Influent Water containing low TDS, moderate to high hardness and very low silica concentrations and recovers 67% to 99.9% of purified water, while eliminating the risk of deposition of hardness, silica and other scale compounds on the membrane surface. This embodiment is very similar to the embodiment of FIG. 1 with the exception that softening of the first stage membrane concentrate is achieved entirely by the IX softening unit 12, thus eliminating the CP softening step in FIG. 1, simplifying the process and reducing the capital and operating costs of the process. This is possible in view of the effectiveness of IX in removing hardness ions and because of the very low Influent Water silica concentration. Addition of anti-scalant compounds in the pretreatment step 2 will guard against precipitation of silica over the first stage membranes 4 and second stage membranes 14, since the Influent Water silica concentration is sufficiently low.

Figure 6:
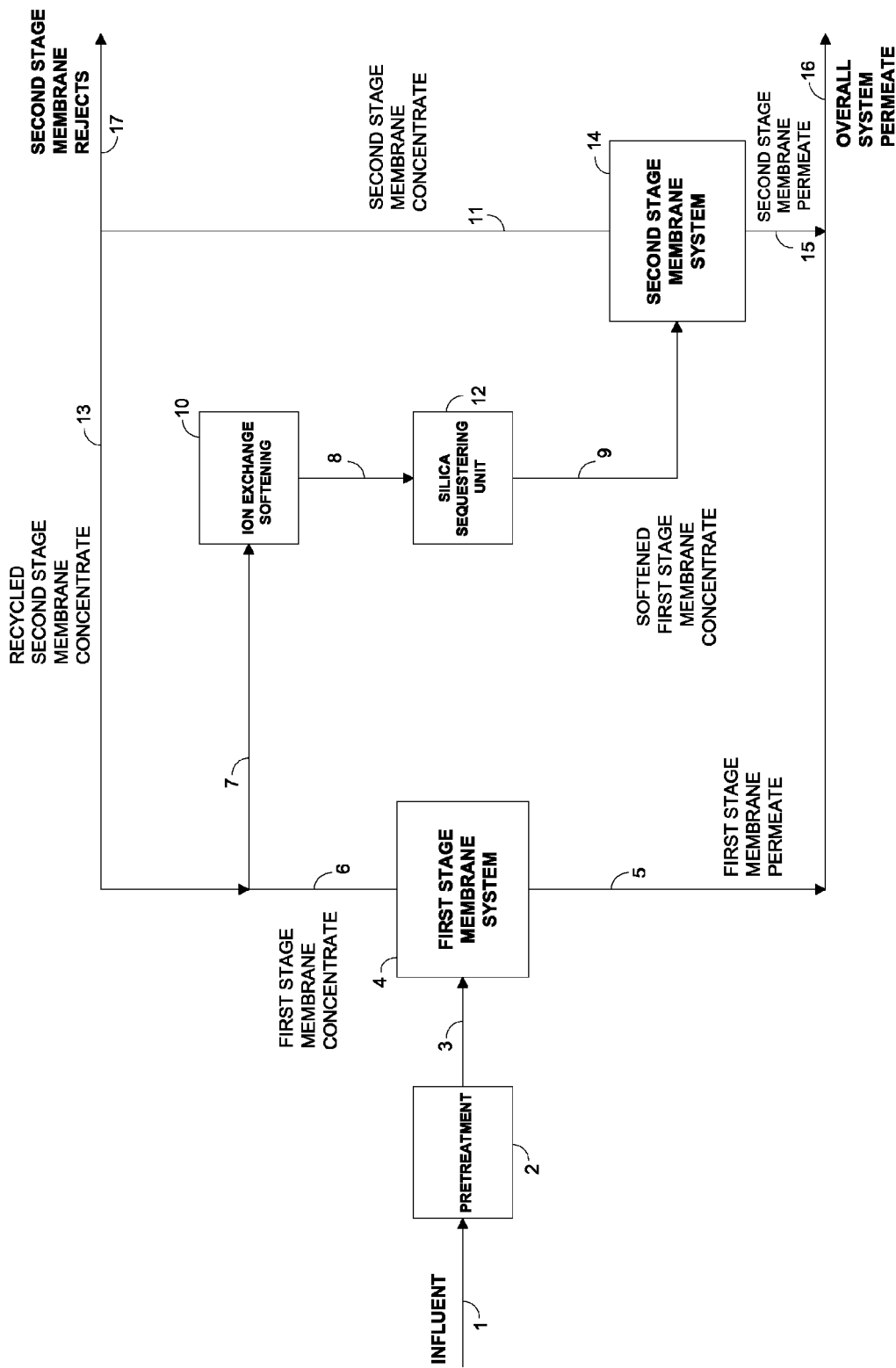
FIG. 6 is a schematic representation of yet another embodiment of the enhanced high recovery 2-stage membrane process of FIG. 1 (RO1-IX-SSU-RO2) which treats high flow Influent Water containing low TDS, moderate hardness and low to moderate silica and recovers 67% to 99.9% of purified water, while eliminating the risk of deposition of hardness, silica and other scale compounds on the membrane surface.

FIG. 6 is a schematic representation of yet another embodiment of the enhanced high recovery 2-stage membrane process of FIG. 1 (RO1-IX-SSU-RO2) which treats high flow Influent Water 1 containing low TDS, moderate hardness and low to moderate silica and recovers 67% to 99.9% of purified water, while eliminating the risk of deposition of hardness, silica and other scale compounds on the membrane surface. This embodiment of the invention is similar to the embodiment illustrated in FIG. 1 with the exception that the chemical precipitation softening step has been removed in view of the moderate hardness and low to moderate silica in the Influent Water, and silica sequestering unit (SSU) 12 has been added to effectively remove the silica. In this embodiment, the hardness is conveniently and effectively removed by the ion exchange softening unit 10, whereas the silica is removed by the SSU, thus eliminating the rather complex and costly chemical precipitation softening, clarification, filtration and chemical conditioning steps. The IX softened and silica-free $1^{st}$ stage membrane concentrate 9 is introduced into the $2^{nd}$ stage membrane unit 14 to effect further purified water recovery without precipitation of hardness compounds and silica on said $2^{nd}$ stage membranes. The $2^{nd}$ stage membrane concentrate 13 is recycled, blended with the $1^{st}$ stage membrane concentrate 6 and the combined membrane concentrate stream 7 is introduced into the IX softening and silica sequestering units to enable further removal of accumulated hardness and silica before effecting further purified water recovery on the $2^{nd}$ stage membrane unit 14. A small stream of high TDS second stage membrane concentrate 17 is discharged to prevent build up of TDS and scale compounds and control the osmotic pressure and operating pressure of the $2^{nd}$ stage membrane system. The second stage membrane permeate 15 is combined with the first stage membrane permeate 5 and removed as final recovered purified water 16.

Figure 7:
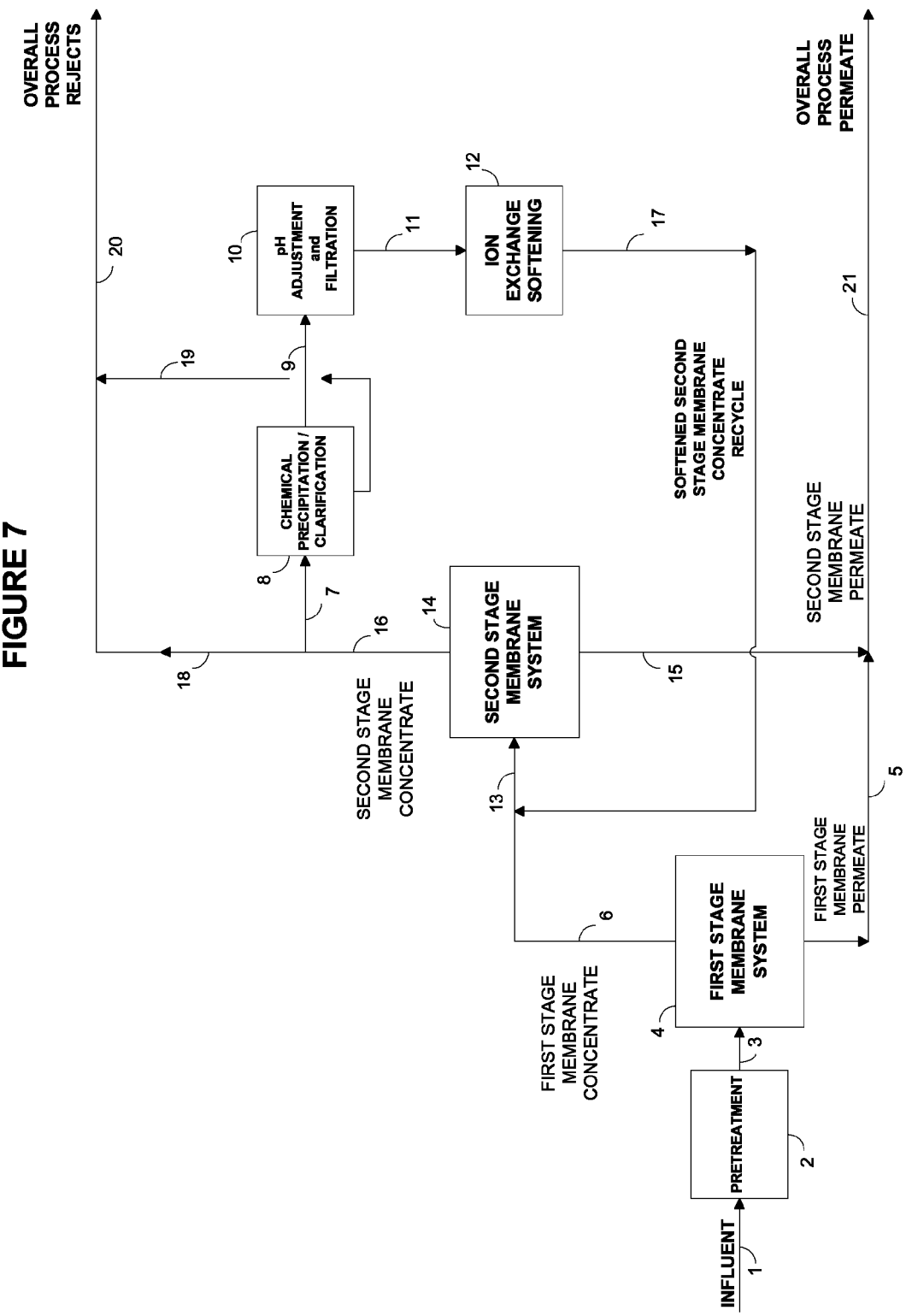
FIG. 7 is a schematic representation of another enhanced high recovery 2-stage membrane process (RO1-RO2-CP-IX) which treats high flowrates of Influent Water containing low TDS, low to moderate hardness and low silica concentrations and recovers 67% to 99.9% of purified water, while eliminating the risk of deposition of hardness and silica on the membrane surface.

FIG. 7 is a schematic representation of another enhanced high recovery 2-stage membrane process (RO1-RO2-CP-IX) which treats high flowrates of Influent Water 1 containing low TDS, low to moderate hardness and low silica concentrations and recovers 67% to 99.9% of purified water, while eliminating the risk of deposition of hardness and silica on the membrane surface. In this case, because of the lower hardness in the Influent Water when compared to the embodiment in FIG. 1, the chemical precipitation softening step 8 and ion exchange hardness polishing step 12 are placed downstream from (i.e. after) the second stage high pressure membrane unit 14, thus reducing the volume of membrane concentrate 7 to be treated and recycled, resulting in smaller concentrate softening and polishing equipment and lower capital cost. As described in the embodiment illustrated in FIG. 1, the chemically softened and clarified membrane concentrate 9 is filtered and pH adjusted in 10 and then introduced into an ion exchange softening unit 12 which completely removes hardness and produces high TDS softened water 17 for recycling, blending with first stage membrane concentrate 6 and further purification by the second stage membrane system 14. A small second stage membrane concentrate bleed stream 18 is combined with a small clarifier bottoms slurry stream 19 and removed from the process as a small overall process reject stream 20. The first stage membrane permeate 5 is combined with the second stage membrane permeate 15 and removed as a purified water product 21.

Figure 8:
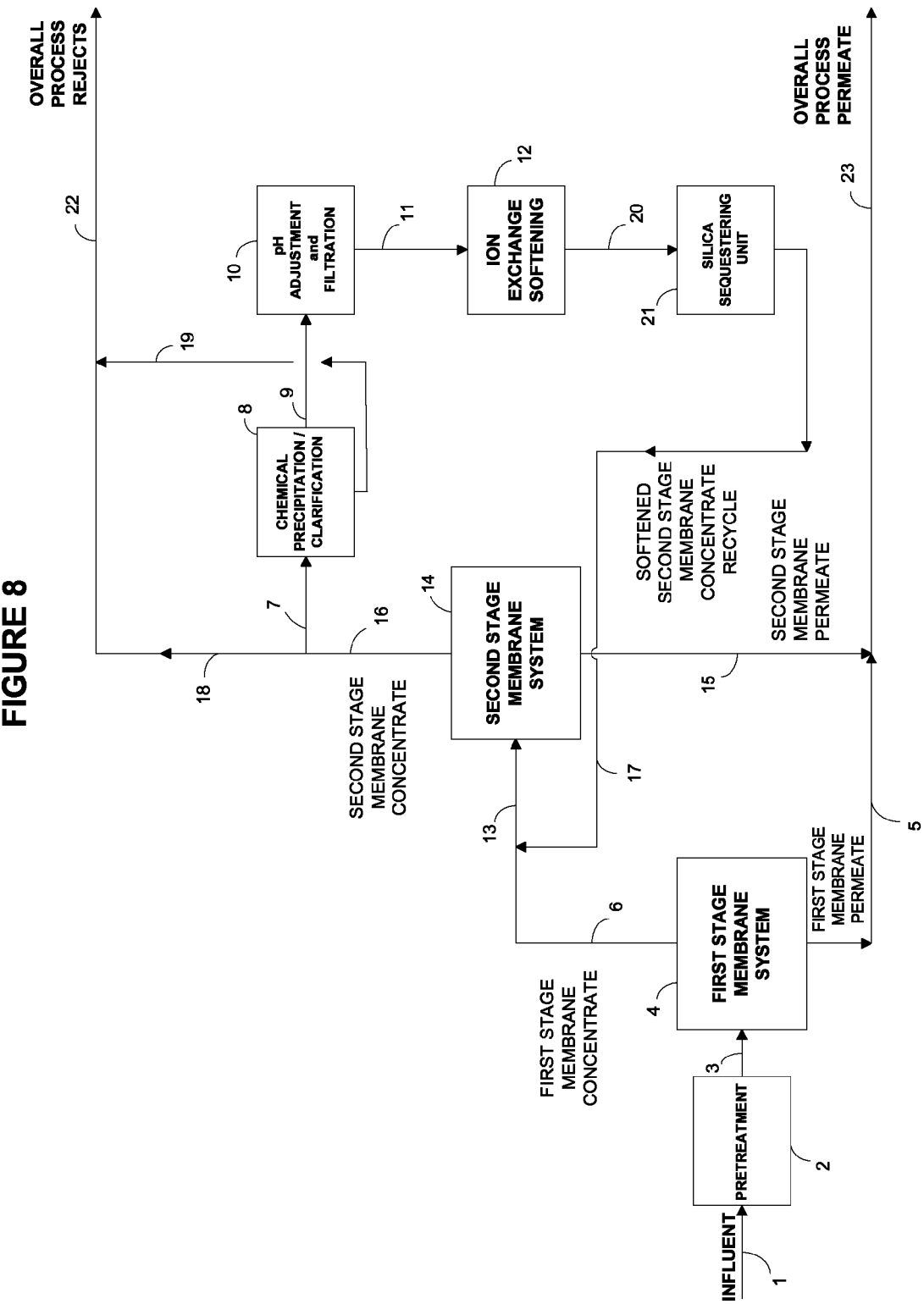
FIG. 8 is a schematic representation of another embodiment of the enhanced 2-stage high recovery membrane process of FIG. 7 (RO1-RO2-CP-IX-SSU) with post $2^{nd}$ stage membrane concentrate softening and recycling of the softened concentrate, which treats high flowrate Influent Water with low TDS, low to moderate hardness and low to moderate silica and recovers 67% to 99.9% of purified water, while eliminating the risk of deposition of hardness and silica on the membrane surface.

FIG. 8 is a schematic representation of another embodiment of the enhanced 2-stage high recovery membrane process of FIG. 7 (RO1-RO2-CP-IX-SSU) with post $2^{nd}$ stage membrane concentrate softening and recycling of the softened concentrate, which treats high flowrate Influent Water 1 with low TDS, low to moderate hardness and low to moderate silica and recovers 67% to 99.9% of purified water, while eliminating the risk of deposition of hardness and silica on the membrane surface. This embodiment of the invention is similar to the embodiment illustrated in FIG. 7 with the exception that in addition to the IX hardness polishing step 12, the chemically softened, clarified, filtered, chemically conditioned and IX-polished $2^{nd}$ stage membrane concentrate 20 is treated further by using a silica sequestering unit 21. This step ensures complete removal of residual silica in view of the somewhat higher silica concentration in the Influent Water 1, thus enabling efficient operation of the second stage membranes 14 and achieving very high overall permeate recoveries without precipitation of silica on said second stage membranes. As described in the embodiment of FIG. 7, because of the relatively low hardness in the Influent Water, the chemical precipitation softening step 8 and ion exchange hardness polishing step 12 are placed downstream from (i.e. after) the second stage high pressure membrane unit 14, thus reducing the volume of membrane concentrate 7 to be treated and recycled, resulting in smaller concentrate softening and polishing equipment and lower capital cost. The recycled, completely softened high TDS $2^{nd}$ stage membrane concentrate 17 is blended with first stage membrane concentrate 6 and introduced as stream 13 into the $2^{nd}$ stage membrane unit 14 to achieve further permeate recovery. A small stream of high TDS $2^{nd}$ stage membrane concentrate 18 is combined with clarifier slurry bottoms 19 and discharged as a small process reject stream 22. The second stage membrane permeate 15 is combined with the first stage membrane permeate 5 and removed as final recovered purified water product 23.

Figure 9:
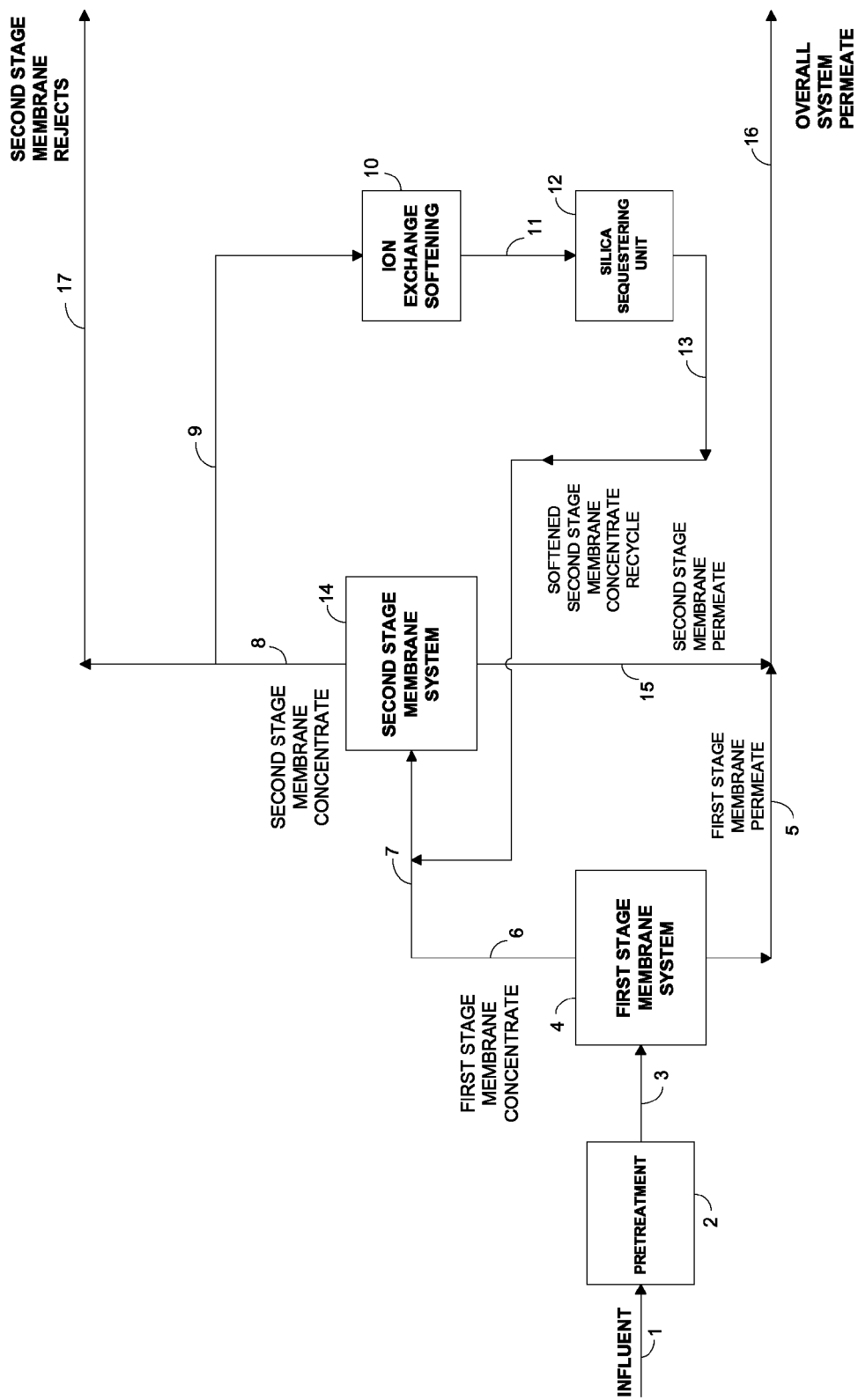
FIG. 9 is a schematic representation of yet another embodiment of the enhanced high recovery 2-stage membrane process depicted in FIG. 8 (RO1-RO2-IX-SSU), which treats high flow Influent Water containing low TDS, low hardness and low to moderate silica and recovers 67% to 99.9% of purified water, while eliminating the risk of deposition of hardness, silica and other scale compounds on the membrane surface.

FIG. 9 is a schematic representation of yet another embodiment of the enhanced high recovery 2-stage membrane process depicted in FIG. 8 (RO1-RO2-IX-SSU), which treats high flow Influent Water 1 containing low TDS, low hardness and low to moderate silica and recovers 67% to 99.9% of purified water, while eliminating the risk of deposition of hardness, silica and other scale compounds on the membrane surface. This embodiment of the invention is similar to the embodiment illustrated in FIG. 8 with the exception that the chemical precipitation softening step has been removed in view of the low hardness and low to moderate silica in the Influent Water. In this embodiment, the hardness is conveniently and effectively removed by the ion exchange softening unit 10, whereas the silica is conveniently and effectively removed by the silica sequestering unit 12, thus eliminating the rather complex and costly chemical precipitation softening, clarification, filtration and chemical conditioning steps intended to remove most of the hardness and silica. The completely softened high TDS $2^{nd}$ stage membrane concentrate 13 is recycled, combined with first stage membrane concentrate 6 and introduced as stream 7 into the high pressure side of said $2^{nd}$ stage membrane unit 14 to provide further purified water recovery. A small stream of high TDS $2^{nd}$ stage membrane concentrate 17 is discharged to prevent build up of TDS and scale compounds and to control the osmotic pressure and operating pressure of the $2^{nd}$ stage membrane system. The second stage membrane permeate 15 is combined with the first stage membrane permeate 5 and removed as final recovered purified water product 16.

Figure 10:
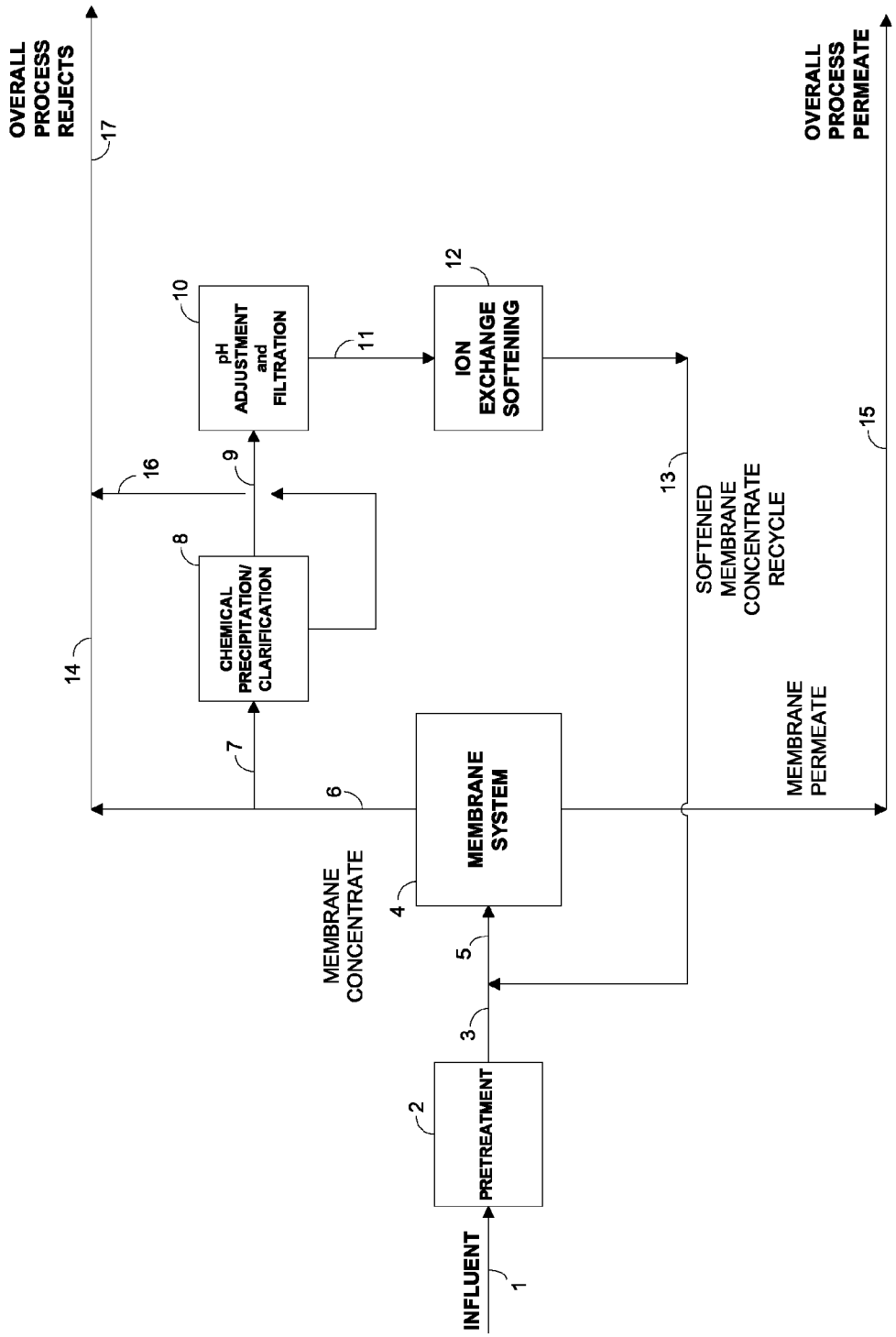
FIG. 10 is a schematic representation of another enhanced high recovery single stage membrane process (RO-CP-IX) which treats low flow Influent Water or Influent Water containing a moderate concentration of TDS, low to moderate hardness and low to moderate silica concentrations and recovers 67% to 99.9% of purified water, while eliminating the risk of deposition of hardness, silica and other scale compounds on the membrane surface.

FIG. 10 is a schematic representation of another enhanced high recovery single stage membrane process (RO-CP-IX) which treats low flow Influent Water or Influent Water containing a moderate concentration of total dissolved solids (TDS), low to moderate hardness and low to moderate silica concentrations and recovers 67% to 99.9% of purified water, while eliminating the risk of deposition of hardness, silica and other scale compounds on the membrane surface. In this simplified embodiment, the Influent Water 1 is pretreated in 2 to remove suspended solids and other insoluble contaminants as described in the Summary of the Invention. The pretreated Influent Water 3 is combined with recycled, completely softened, high TDS membrane concentrate 13, conditioned chemically and introduced into the single stage membrane system 4 in order to produce said recoveries of purified water 15 while preventing scale formation on the membrane surface. The membrane concentrate 7 is chemically softened in 8 by adding a suitable alkali solution to raise the pH and precipitate most of the hardness and silica compounds. After clarification, filtration and pH adjustment of the chemically softened supernatant in 10, residual hardness in said supernatant is removed by passage through an ion exchange unit 12 and the completely softened high TDS membrane concentrate 13 is recycled, blended with pretreated Influent Water 3 and introduced into the membrane system to achieve further purified water recovery, as described above. A small stream of high TDS membrane concentrate 14 is combined with clarifier slurry rejects 16 and discharged as a small process reject stream 17 in order to prevent build up of the sparingly soluble hardness compounds and control the osmotic pressure.

Figure 11:
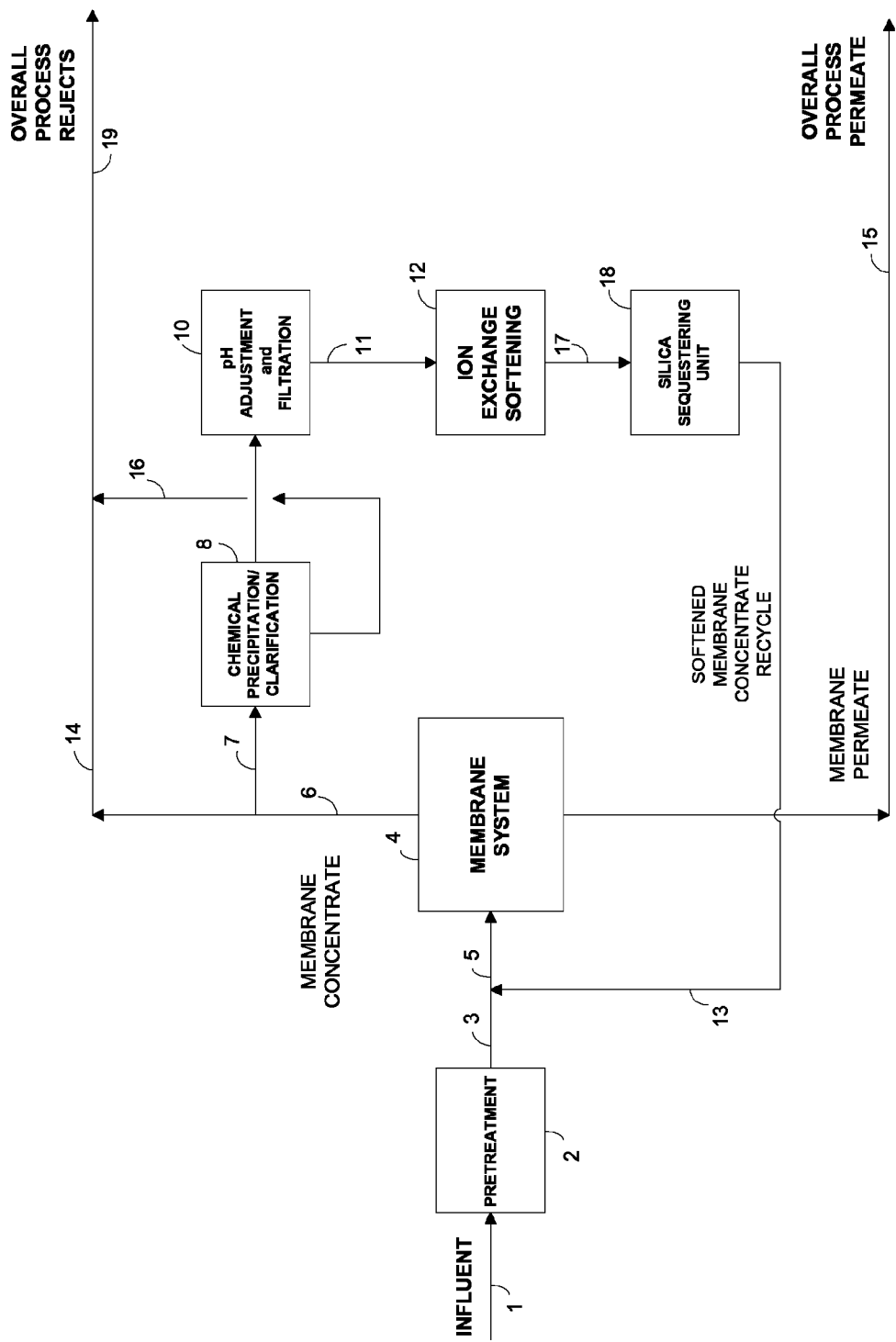
FIG. 11 is a schematic representation of another embodiment of the enhanced high recovery single stage membrane process of FIG. 10 (RO-CP-IX-SSU) which treats low flow Influent Water containing a moderate concentration of total dissolved solids (TDS), low to moderate hardness and moderate to high silica concentrations, and recovers 67% to 99.9% of purified water, while eliminating the risk of deposition of hardness, silica and other scale compounds on the membrane surface.

FIG. 11 is a schematic representation of another embodiment of the enhanced high recovery single stage membrane process of FIG. 10 (RO-CP-IX-SSU) which treats low flow Influent Water 1 containing a moderate concentration of total dissolved solids (TDS), low to moderate hardness and moderate to high silica concentrations, and recovers 67% to 99.9% of purified water 15, while eliminating the risk of deposition of hardness, silica and other scale compounds on the membrane surface. This embodiment of the invention is similar to the embodiment illustrated in FIG. 10 with the exception that in addition to the IX softening step 12, the chemically softened, clarified, filtered, chemically conditioned and IX-polished membrane concentrate 17 is treated further by using a silica sequestering unit 18. This silica sequestering unit 18 ensures complete removal of residual silica in the recycled stream 13, in view of the high silica concentration in the Influent Water 1, thus enabling efficient operation of the membranes 4 and achieving very high overall permeate recoveries without precipitation of silica on said membranes. Said completely softened high TDS concentrate 13 is recycled, combined with pretreated Influent Water 3 and introduced into membrane unit 4 to provide further purified water recovery. A small stream of high TDS membrane concentrate 14 is combined with clarifier slurry bottoms 16 and discharged as a small process reject stream 19 in order to prevent build up of the sparingly soluble hardness compounds and to control the osmotic pressure.

Figure 12:
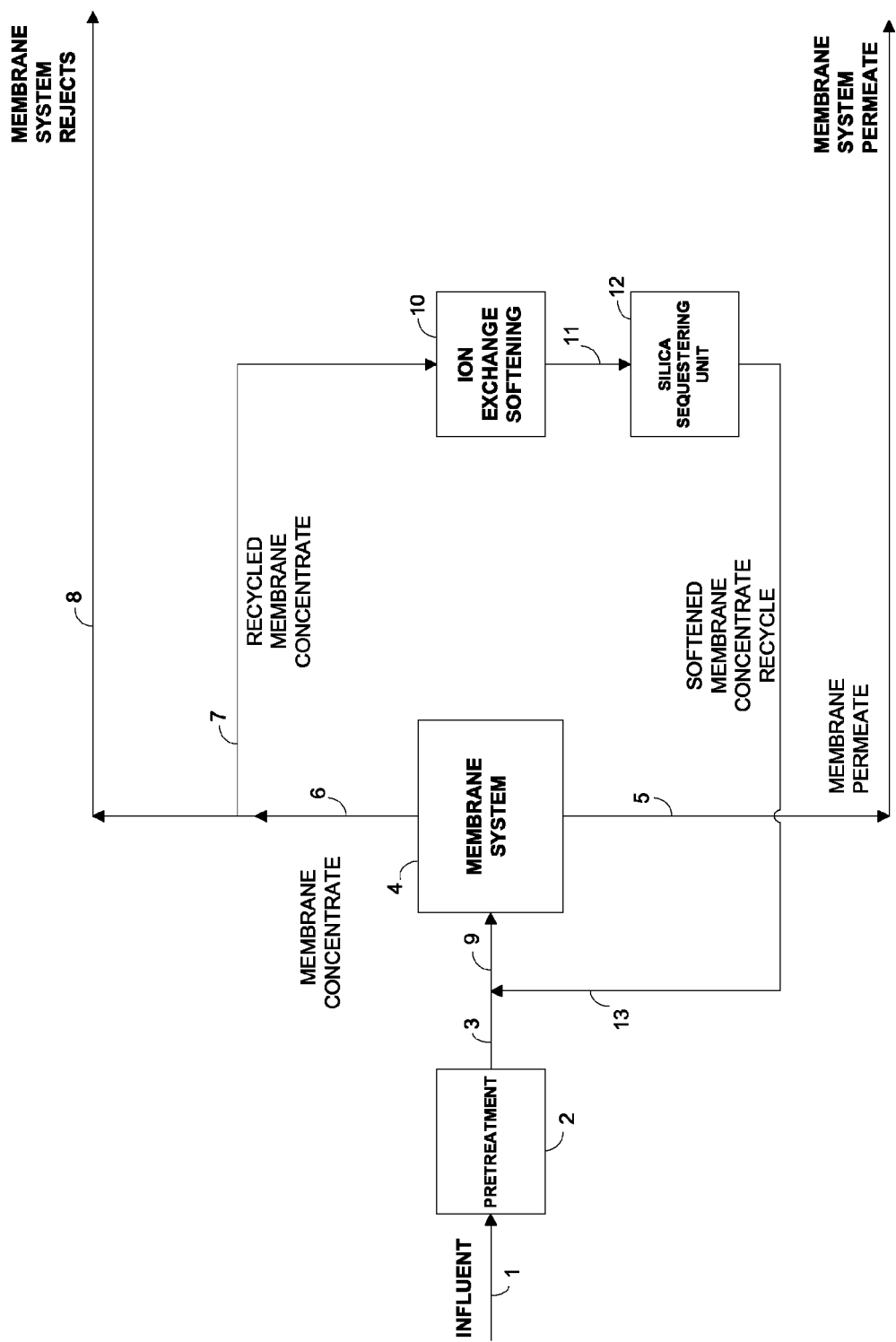
FIG. 12 is a schematic representation of yet another embodiment of the enhanced high recovery single stage membrane process depicted in FIG. 10 (RO-IX-SSU), which treats low flow Influent Water containing high TDS, low hardness and low silica and recovers 67% to 99.9% of purified water, while eliminating the risk of deposition of hardness, silica and other scale compounds on the surface of membrane unit.

FIG. 12 is a schematic representation of yet another embodiment of the enhanced high recovery single stage membrane process depicted in FIG. 10 (RO-IX-SSU), which treats low flow Influent Water 1 containing high TDS, low hardness and low silica and recovers 67% to 99.9% of purified water, while eliminating the risk of deposition of hardness, silica and other scale compounds on the surface of membrane unit 4. This embodiment of the invention is similar to the embodiment illustrated in FIG. 10 with the exception that the chemical precipitation softening step has been removed in view of the low hardness and low silica in the Influent Water. In this embodiment, the hardness is conveniently and effectively removed by the ion exchange softening unit 10, whereas the silica is conveniently and effectively removed by the silica sequestering unit 12, thus eliminating the rather complex and costly chemical precipitation softening, clarification, filtration and chemical conditioning steps. The completely softened high TDS membrane concentrate 13 is recycled, combined with pre-treated Influent 3 and introduced as stream 9 into the high pressure side of said membrane unit 4 to provide further purified water recovery. A small stream of high TDS membrane concentrate 8 is discharged to prevent build up of TDS and scale compounds and control the osmotic pressure and operating pressure of the membrane system. The membrane permeate 5 is removed as final recovered purified product.

Figure 13:
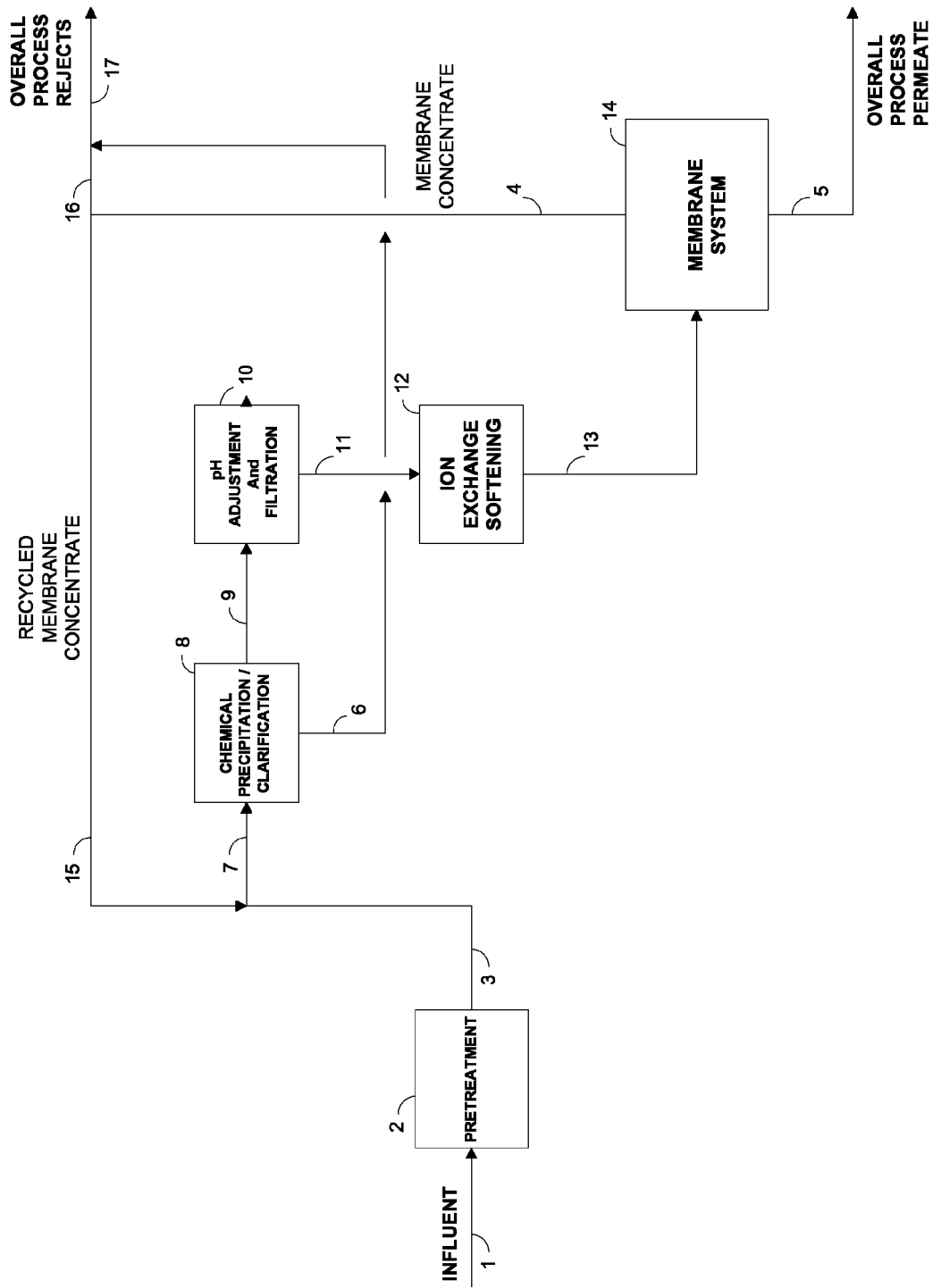
FIG. 13 is a schematic representation of yet another enhanced high recovery single stage membrane process (CP-IX-RO) which treats low flow Influent Water or Influent Water containing a moderate concentration of total dissolved solids (TDS), high to very high hardness and low to moderate silica concentrations and recovers 67% to 99.9% of purified water, while eliminating the risk of deposition of hardness, silica and other scale compounds on the membrane surface.

FIG. 13 is a schematic representation of yet another enhanced high recovery single stage membrane process (CP-IX-RO) which treats low flow Influent Water or Influent Water containing a moderate concentration of total dissolved solids (TDS), high to very high hardness and low to moderate silica concentrations and recovers 67% to 99.9% of purified water, while eliminating the risk of deposition of hardness, silica and other scale compounds on the membrane surface. In this embodiment, the Influent Water 1 is pretreated in 2 to remove oil if the Influent water contains free or emulsified oil and produce oil-free Influent Water 3. If the Influent Water 1 does not contain free or emulsified oil, said Influent Water is directly combined with recycled, high TDS membrane concentrate 15 and the resulting moderate TDS stream 7 is introduced into a chemical precipitation and clarification unit 8 where a suitable alkali solution is added to remove most of the hardness and silica. After filtration and pH adjustment of the chemically softened supernatant in 10, residual hardness in said supernatant 11 is removed by passage through an ion exchange unit 12 and the completely softened moderate TDS stream 13 is introduced into the single stage membrane system 14 in order to produce said high recoveries of purified water 5 while preventing scale formation on the membrane surface. The membrane concentrate 15 is recycled, blended with pretreated Influent Water and chemically softened in 8 as described earlier to enable further purified water recovery from the concentrate. A small stream of high TDS membrane concentrate 16 is combined with clarifier slurry rejects 6 and discharged as a small process reject stream 17 in order to prevent build up of TDS and scale compounds and control the osmotic pressure and operating pressure of the membrane unit.

Figure 14:
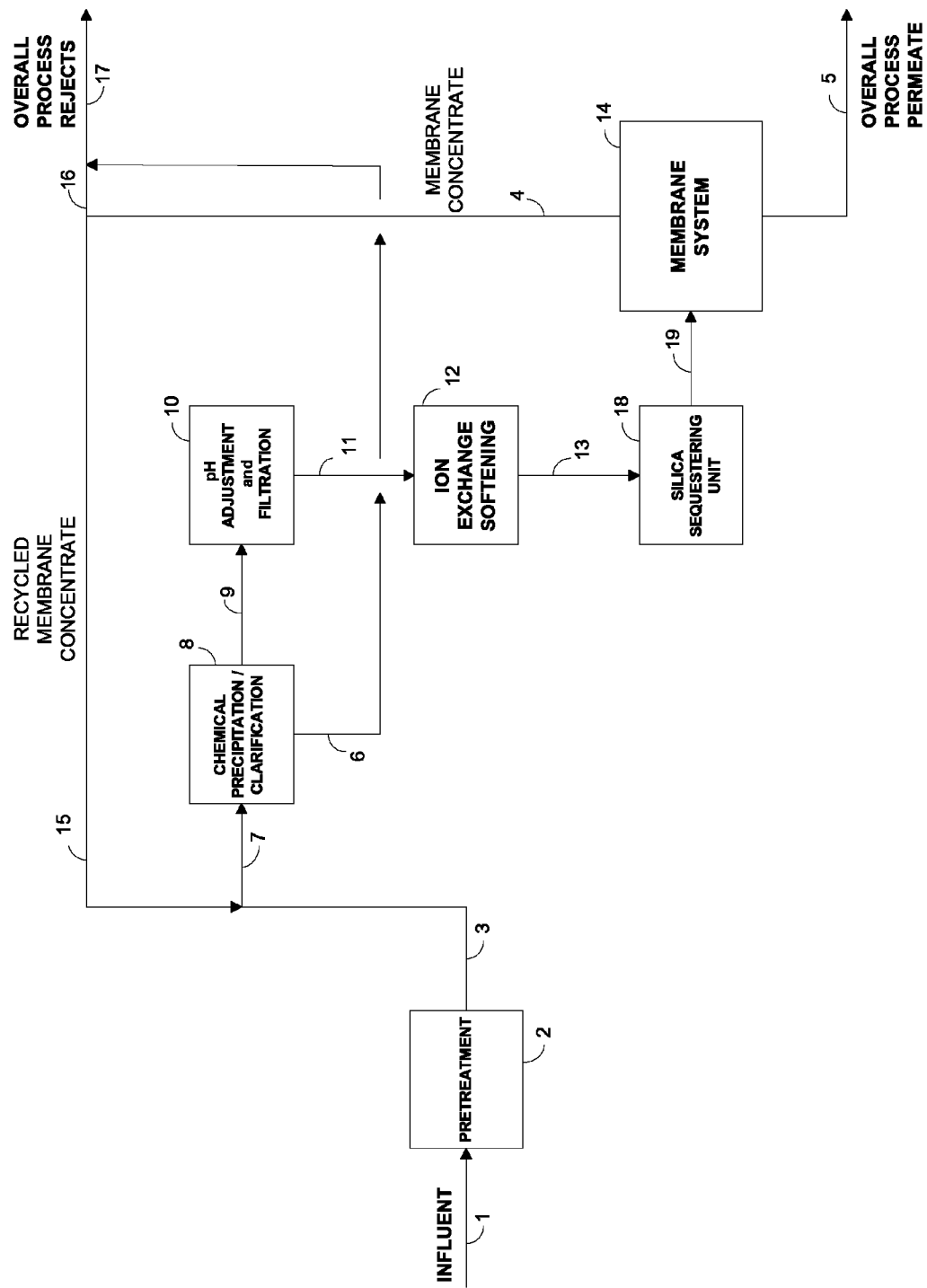
FIG. 14 is a schematic representation of another embodiment of the enhanced high recovery single stage membrane process of FIG. 13 (CP-IX-SSU-RO) which treats low flow Influent Water containing a moderate concentration of TDS, high to very high hardness and high silica concentrations, and recovers 67% to 99.9% of purified water, while eliminating the risk of deposition of hardness, silica and other scale compounds on the membrane surface.

FIG. 14 is a schematic representation of another embodiment of the enhanced high recovery single stage membrane process of FIG. 13 (CP-IX-SSU-RO) which treats low flow Influent Water 1 containing a moderate concentration of total dissolved solids (TDS), high to very high hardness and high silica concentrations, and recovers 67% to 99.9% of purified water 5, while eliminating the risk of deposition of hardness, silica and other scale compounds on the membrane surface. This embodiment of the invention is similar to the embodiment illustrated in FIG. 13 with the exception that in addition to the IX hardness polishing step 12, the chemically softened, clarified, filtered, chemically conditioned and IX-polished combined influent and recycled membrane concentrate stream 13 is treated further by using a silica sequestering unit 18 to ensure complete removal of residual silica before the purification step 14. The completely softened moderate TDS stream 19 is introduced into the single stage membrane system 14 in order to produce said high recoveries of purified water 5 while preventing scale formation on the membrane surface. The membrane concentrate 15 is recycled for further purified water recovery after softening while a small stream of high TDS membrane concentrate 16 is combined with clarifier slurry bottoms 6 and discharged as a small process reject stream 17 in order to prevent build up of TDS and scale compounds and control the osmotic pressure and operating pressure of the membrane unit.

FIG. 15 is a schematic representation of yet another embodiment of the enhanced high recovery single stage membrane process depicted in FIG. 14 (IX-SSU-RO), which treats low flow Influent Water 1 containing high TDS, moderate hardness and low to moderate silica and recovers 67% to 99.9% of purified water, while eliminating the risk of deposition of hardness, silica and other scale compounds on the surface of membrane unit 4. This embodiment of the invention is similar to the embodiment illustrated in FIG. 14 with the exception that the chemical precipitation softening step has been removed in view of the moderate hardness and low to moderate silica in the Influent Water. In this embodiment, the hardness is conveniently and effectively removed by the ion exchange softening unit 10, whereas the silica is conveniently and effectively removed by the silica sequestering unit 12, thus eliminating the rather complex and costly chemical precipitation softening, clarification, filtration and chemical conditioning steps. The completely softened, silica-free pretreated water 13 is introduced into the high pressure side of the single stage membrane unit 4 to provide the desired high recovery of purified product water via permeate stream 5. The membrane concentrate 7 is recycled, combined with pretreated water 3 and further softened in the ion exchange unit 10 and silica sequestering unit 12, respectively, to allow for further water recovery by the membrane unit 4. A small stream of high TDS membrane concentrate 8 is discharged to prevent build up of TDS and scale compounds and control the osmotic pressure and operating pressure of the membrane unit.

The present invention is intended to address limitations of prior art, including U.S. Pat. No. 6,113,797 and U.S. Pat. No. 6,461,514B1. U.S. Pat. No. 6,113,797 teaches using a 2-stage membrane process with post $2^{nd}$ stage membrane concentrate softening that achieves very high purified water recoveries in the range 67% to 99.9%. In U.S. Pat. No. 6,113,797, the high TDS $2^{nd}$ stage membrane concentrate containing most of the soluble and sparingly soluble inorganic ions is softened by chemical precipitation at high pH followed by clarification, filtration and pH reduction, and recycling to the low pressure side of the $2^{nd}$ stage membrane system to achieve further recovery of purified water. Alternatively, if the silica concentration is not limiting, the $2^{nd}$ stage membrane concentrate is softened simply by passage through a suitable ion exchange softening resin, followed by recycling to the low pressure side of said $2^{nd}$ stage membrane system to achieve further purified water recovery. U.S. Pat. No. 6,461,514B1 teaches a single stage high recovery membrane process whereby the membrane concentrate containing high hardness but low silica is softened by passage through a suitable ion exchange softening resin followed by recycling to the low pressure side of said single stage membrane system to achieve further purified water recovery.

It has been found that while the chemical precipitation (i.e. CP) softening step taught in U.S. Pat. No. 6,113,797 is capable of removing most of the hardness and silica from the $2^{nd}$ stage membrane concentrate, said CP softening step will leave a significant concentration of residual hardness (i.e. calcium, magnesium) ions and silica due to inefficiencies in the design or in the operation of said CP softening step. These recycled residual sparingly soluble ions, upon blending with the preconcentrated sparingly soluble ions from the first membrane stage, will concentrate further over the $2^{nd}$ stage membranes, thus potentially forming scale compounds which may limit the overall process purified water recovery, especially in cases where the Influent Water's hardness is large. There are a number of remedies to this problem, including: (1) increasing the flowrate of the recycled $2^{nd}$ stage membrane concentrate, (2) adding acid to decrease the pH of the blended feed to the membrane unit and thus further reduce the calcium and magnesium scale potential, and (3) increase the dosage of the anti-scalant chemical added to further reduce the hardness and silica scale potential, or a combination of these different remedial measures. It will be noted, however, that these alternative remedial measures will adversely affect the capital and/or operating cost of the high recovery process.

When ion exchange (IX) softening is applied on its own to the $2^{nd}$ stage membrane concentrate (in U.S. Pat. No. 6,113,797) or is applied to the single stage membrane process concentrate (in U.S. Pat. No. 6,461,514B1) as a simple, low-cost alternative to CP softening, the IX softening step will not be effective in removing silica from the membrane concentrate, thus allowing the silica to further concentrate over the membranes and potentially limit the overall permeate (i.e. purified water) recovery. The addition of anti-scalants will alleviate but not completely eliminate this problem since anti-scalants have an upper silica solubility range of 200-250 mg/L.

The present patent disclosures are intended to address the above-described limitations of prior art, including U.S. Pat. Nos. 6,113,797 and 6,461,514B1 and enable high purified water recoveries in the range 67% to 99.9% to be achieved in an economical manner irrespective of the concentration of hardness and silica in the Influent Water. Furthermore, the purified water recovery in the present invention will not be adversely affected by design and/or operational deficiencies in the CP softening system that may result in higher residual hardness and silica in the supernatant from the CP step. A total of 15 high recovery process configurations will be disclosed in order to treat Influent Water with different characteristics, in particular depending on the Influent Water's flowrate, total dissolved solids (TDS), total hardness ions and silica concentrations. These process configurations are listed below:

RO1-CP-IX-RO2, as depicted in FIG. 1
    RO1-CP-IX-SSU-RO2, as depicted FIG. 2
    RO1-IX-SSU-RO2, as depicted FIG. 6
    RO1-IX-RO2, as depicted in FIG. 5
    CP-RO1-IX-RO2, as depicted in FIG. 3
    CP-RO1-IX-SSU-RO2, as depicted in FIG. 4
    RO1-RO2-CP-IX, as depicted FIG. 7
    RO1-RO2-CP-IX-SSU, as depicted FIG. 8
    RO1-RO2-IX-SSU, as depicted FIG. 9
    RO-CP-IX, as depicted FIG. 10
    RO-CP-IX-SSU, as depicted FIG. 11
    RO-IX-SSU, as depicted FIG. 12
    CP-IX-RO, as depicted FIG. 13
    CP-IX-SSU-RO, as depicted FIG. 14
    IX-SSU-RO, as depicted FIG. 15

The acronyms used in the above process configurations are explained below:
    RO1 is first stage reverse osmosis membrane system in a 2-stage high recovery membrane process
    RO2 is second stage reverse osmosis membrane system in a 2-stage high recovery membrane process RO is the reverse osmosis membrane system in a single stage high recovery membrane process CP denote chemical precipitation softening to remove bulk hardness and silica IX denotes ion exchange softening to completely remove hardness SSU denotes a single or multiple column silica sequestering unit to efficiently and selectively remove silica.

The best mode of the invention is the RO1-CP-IX-RO2 high recovery process configuration represented schematically in FIG. 1. This mode represents enhanced high recovery 2-stage membrane process which treats high flowrates of Influent Water 1, e.g. >100 US gallons per minute, containing low to moderate concentrations of total dissolved solids (TDS), e.g. 200-4000 mg/L, moderate to high hardness (e.g. 150-300 mg/L as calcium carbonate $CaCO_3$) and low to moderate silica (e.g. 5-40 mg/L) and produces a good quality low-TDS purified water stream 21 and a small volume of high-TDS reject stream 20, while preventing the precipitation of hardness and silica compounds on the surface of the membranes.

As shown in FIG. 1, the Influent Water 1 is first pretreated in 2 to remove suspended solids, colloidal matter, oil if present, and other soluble organic and inorganic fouling material by using a suitable pretreatment means including aeration and/or chemical oxidation to oxidize and precipitate iron and manganese if present, biological treatment to remove soluble organic compounds and prevent biological fouling if the chemical oxygen demand (COD) and biological oxygen demand ($BOD_5$) are significant, coagulation, flocculation, clarification, multi-media filtration, ultrafiltration or microfiltration of the suspended solids, chemically or biologically precipitated solids, followed by chemical conditioning of the suspended solids' free water, including the addition of acid and anti-scalant to further reduce the scale potential of the pretreated water 3. The pretreated water 3 is then introduced into the first stage reverse osmosis (RO) or nanofiltration (NF) membrane system 4, operating at 200-300 psig and up to 600 psig, which purifies a large fraction (i.e. 50% to 75% and up to 85%) of the Influent Water 1, producing a first stage membrane permeate 5 and a smaller first stage membrane concentrate 6 which is normally 20%-30% of the Influent Water flowrate. The first stage membrane concentrate 6 with TDS in the normal range of 1,000-4000 mg/L and up to 10,000 mg/L is blended with recycled high-TDS second stage membrane concentrate 17 to produce a combined membrane concentrate 7 which contains elevated concentrations of TDS (in the range 10,000-20,000 mg/L), elevated hardness and silica. Said combined membrane concentrate 7 is treated in the Chemical Precipitation and Clarification unit 8 by the addition of alkali solutions including sodium hydroxide, sodium carbonate, calcium hydroxide and magnesium hydroxide to raise the pH to the range 10-11, chemically precipitate di-valent and tri-valent hardness compounds including calcium, magnesium, iron, manganese and silica and produce a softened and clarified combined membrane concentrate (i.e. clarifier supernatant) 9 that is low in hardness, silica and other chemical and biological fouling compounds. The chemically softened combined membrane concentrate 9 is filtered in 10 by using a suitable, effective filtration means to remove residual, entrained suspended solids and the pH adjusted to the range 6-8 by the addition of a suitable mineral acid to further reduce said combined concentrate stream's temporary hardness and produce a chemically softened, clarified and filtered combined membrane concentrate 11. As shown in FIG. 1, the said chemically softened, clarified and filtered combined membrane concentrate 11 is further softened in ion exchange softening unit 12 where the residual hardness ions including barium, calcium and magnesium and residual heavy metals including aluminum, iron and manganese are separated efficiently, producing completely softened combined membrane concentrate 13. Said completely softened combined membrane concentrate 13 is introduced into the high pressure second stage RO or NF membrane system 17, normally operating at up to 1100 psig and possibly up to 2000 or even 3000 psig to produce additional, purified second stage membrane permeate 15 and a high-TDS second stage membrane concentrate 16 with a TDS normally in the range 20,000-40,000 mg/L and up to 80,000 to 100,000 mg/L. The purified second stage membrane permeate 15 is combined with the first stage membrane permeate 5 to produce a combined purified membrane process permeate 21 which is equivalent to 67% to 99.9% of the flowrate of the Influent Water 1. A large fraction of the second stage membrane concentrate 17 is recycled and combined with the first stage membrane concentrate 6 to achieve further softening and water recovery as described earlier. A small stream of high TDS second stage membrane concentrate 18 is combined with clarifier slurry rejects 19 and discharged as a small process reject stream 20 to limit the osmotic pressure. The second stage membrane permeate 15 is combined with the first stage membrane permeate 5 and removed as final recovered product 21.

The other embodiments of the invention have been described earlier and are represented in FIGS. 2-15, respectively. As described earlier, these embodiments are intended to address variable Influent Water flowrates, TDS, hardness and silica concentrations, thus ensuring effectiveness of separation of hardness and silica compounds while minimizing the capital and operating costs.

For example, when the Influent Water flowrate is small, e.g. <100 U.S. gpm, and/or when the Influent Water TDS is high (e.g. in the range 5,000-10,000 mg/L), a single stage enhanced high recovery membrane process is used, as illustrated in the embodiments of FIGS. 10, 13, 11, 14, 12 and 15. In these cases, the single stage membrane process will operate at high pressure of 500-1100 psig and up to 3000 psig. When the Influent Water flowrate is higher (i.e. >100 gpm) and when the TDS is low (i.e. <5000 mg/L), two-stage enhanced high recovery membrane processes are used in order to extract most of the purified water (i.e. permeate) at the low pressure of the first stage membrane system, thus saving energy and reducing the membrane costs. The first stage membrane system can operate at up to 600 psig, while the second stage, processing much smaller flowrates, are operated at up to 1100 psig and possibly up to 3000 psig.

The enhanced high recovery process configuration, i.e. the relative location of the chemical precipitation unit (CP), the ion exchange softening unit (IX) and the silica sequestering unit (SSU) is dictated by the relative concentrations of hardness ions, especially calcium, magnesium and barium, heavy metal foulants, including iron, manganese and aluminum and by the concentration of silica relative to the hardness. For example, when the concentration of hardness and silica are both relatively low, the single stage RO-CP-IX configuration (FIG. 10) and 2-stage RO1-RO2-CP-IX (FIG. 7), RO1-RO2-CP-IX-SSU (FIG. 8) and RO1-RO2-IX-SSU (FIG. 9) configurations may be used. This is feasible since it is possible to preconcentrate hardness and silica compounds to a reasonable extent over RO1 and RO2 membrane systems without scale formation by acidification and anti-scalant dosing of the Influent, followed by removal of said preconcentrated hardness and silica compounds from the concentrate of the second stage membranes and recycling of said softened high TDS membrane concentrate to the low pressure side of said second stage membranes, to enable further purified water recoveries.

While prior art, U.S. Pat. No. 6,113,797 teaches a high recovery 2-stage process that includes RO1-RO2-CP configuration and RO1-RO2-IX configuration, and prior art U.S. Pat. No. 6,461,514 teaches a single stage high recovery process with a simple RO-IX configuration, it can be seen that the recycled, softened membrane concentrate may contain significant concentrations of the residual hardness, silica and other fouling compounds. Said residual hardness, silica and other fouling compounds may interfere with the efficient operation of the single stage membranes or the second stage membranes of the 2-stage process, potentially causing premature fouling and scale formation and requiring higher softened concentrate recycle flowrates and higher costs. By adding IX, IX-SSU to the RO1-RO2-CP process configuration and adding CP and SSU to the RO-IX configuration in the prior art, the fouling potential and scale formation potential over the second stage or single stage membranes, respectively, are substantially reduced in the present invention.

When the hardness and silica concentrations in the Influent are moderate to high, the 2-stage RO1-CP-IX-RO2 configuration described earlier (FIG. 1), the 2-stage RO1-CP-IX-SSU-RO2 configuration (FIG. 2) and the 2-stage RO1-IX-SSU-RO2 configuration (FIG. 6), as well as the 1-stage CP-IX-RO configuration (FIG. 13), 1-stage CP-IX-SSU-RO configuration (FIG. 14) and the 1-stage IX-SSU-RO configuration (FIG. 15) are utilized. The choice of the softening protocol, i.e. CP-IX, CP-IX-SSU or IX-SSU is dictated by the extent of hardness concentration, the extent of silica concentration and their relative magnitudes in the Influent Water, with the CP-IX-SSU train providing the highest removal of both hardness and silica, thus corresponding to Influent Water with high hardness and high silica concentrations. When the concentration of hardness and silica in the Influent Water is high to very high, the CP-RO1-IX-RO2 configuration (FIG. 3) and CP-RO1-IX-SSU-RO2 configuration (FIG. 4) are used, respectively as described earlier. When the silica concentration in the Influent Water is very low, the RO1-IX-RO2 configuration (FIG. 5) is recommended.

What is claimed is:

1. An improved enhanced two-stage high recovery membrane process for the economical operation of semi-permeable reverse osmosis (RO) membranes which are used to purify water containing soluble and sparingly soluble inorganic compounds and achieve high recoveries of purified water in the range 67%-99.9% of the Influent Water without precipitation of sparingly soluble inorganic scale compounds on the surface of the membrane, comprising:
a) pretreatment of the Influent Water, containing soluble and sparingly soluble inorganic compounds by filtration to separate suspended solids using a suitable filtration means and preconditioning by adding acid and antiscalant to produce a preconditioned Influent Water;
b) introducing said preconditioned Influent Water into the high pressure side of a first stage RO membrane system (RO1) and pressurizing said preconditioned Influent Water to produce purified water permeate on the low pressure side that is substantially free of said inorganic compounds;
c) removing first stage RO1 membrane concentrate containing preconcentrated soluble and sparingly soluble inorganic compounds from the high pressure side of said RO1 membrane system without precipitation of said preconcentrated sparingly soluble inorganic compounds on said RO1 membrane;
d) recovering the bulk of purified water permeate on the low pressure side of said RO1 membrane at a rate at least 50% of the rate of introducing said preconditioned Influent Water to the high pressure side of said RO1 membrane;
e) blending said RO1 membrane concentrate containing preconcentrated soluble and sparingly soluble inorganic compounds with a softened second stage RO membrane (RO2) concentrate recycle stream producing a blended membrane concentrate containing elevated sparingly soluble inorganic compounds;
f) introducing said blended membrane concentrate stream containing said elevated sparingly soluble inorganic compounds into a well-mixed chemical precipitation tank wherein the pH is raised by adding an alkaline solution to provide a precipitate of the insoluble inorganic compounds;
g) removing the well-mixed suspension containing chemically-precipitated inorganic compounds from the chemical precipitation tank;
h) introducing the well-mixed suspension containing chemically-precipitated inorganic compounds into a clarifier to produce a supernatant solution at the top of the tank which is substantially (but not completely) free from suspended solids and a slurry phase at the bottom containing most of the suspended solids;
i) removing the bulk solids from the bottom of the clarifier as a slurry reject stream containing TDS in the range 1%-5% and Total Suspended Solids (TSS) in the range 2%-5%;
j) removing the supernatant from the top of the clarifier, containing Total Dissolved Solids (TDS) in the range 1%-5% and TSS in the range 50-250 mg/L;
k) reducing the pH of the supernatant removed from the top of the clarifier to a pH in the neutral range of 6-9 by adding a suitable mineral acid;
l) introducing the pH-adjusted supernatant from the clarifier into a suitable filtration means in order to provide a "blended, softened and suspended solids-free" concentrate stream;
m) introducing said "blended, softened and suspended solids-free" concentrate stream into a suitable ion exchange softening means to provide a "blended, softened, suspended solids-free and hardness-free" concentrate stream;
n) introducing said "blended, softened, suspended solids-free and hardness-free" concentrate into the high pressure side of a second stage RO membrane system (RO2) and pressurizing said blended, softened, suspended solids-free and hardness-free concentrate to produce purified water permeate on the low pressure side of said RO2 membrane system that is substantially free of said inorganic compounds;
o) removing RO2 membrane concentrate containing concentrated soluble and "under-saturated" sparingly soluble inorganic compounds from the high pressure side of said RO2 membrane system without precipitation of said sparingly soluble inorganic compounds on the surface of the membrane;
p) recovering the remaining purified water permeate on the low pressure side of said RO2 membrane system at a rate at least 5% and up to 50% of the rate of said Influent Water;
q) combining the purified water permeate from said RO1 membrane system with purified water from said RO2 membrane system to provide the final purified water stream at a rate ranging from 67%-99.9% of the rate of said Influent water;
r) splitting said RO2 membrane concentrate into an RO2 membrane concentrate recycle stream which is recycled and blended with said RO1 membrane concentrate, and an RO2 membrane reject stream;

s) adjusting the flowrates of said slurry reject stream from the bottom of the clarifier and said RO2 membrane reject stream to control the concentration of soluble inorganic compounds and hence the osmotic pressure;

t) removing said slurry reject stream and said RO2 membrane reject stream from the process as final rejects for disposal or further treatment.

2. The process in accordance with claim 1 where the first stage contains a nanofiltration membrane (NF) and the second stage contains a reverse osmosis membrane (RO).

3. The process in accordance with claims 1 and 2 where said "blended, softened, suspended solids-free and hardness-free" concentrate stream from said ion exchange softening means is introduced into a silica sequestering unit (SSU) containing granular activated alumina or other selective silica removing material to produce a blended, softened, suspended solids-free, hardness-free and silica-free" concentrate stream that is introduced into said high pressure side of said second stage RO membrane system (RO2) to produce further purified water permeate without precipitation of said sparingly soluble inorganic compounds on the surface of said RO2 membranes.

* * * * *